(12) United States Patent
Uchida et al.

(10) Patent No.: US 10,542,178 B2
(45) Date of Patent: Jan. 21, 2020

(54) VIRTUAL EXECUTION DEVICE, VIRTUAL EXECUTION METHOD AND NON-TRANSITORY COMPUTER READABLE RECORDING MEDIUM STORING VIRTUAL EXECUTION PROGRAM

(71) Applicant: Konica Minolta, Inc., Chiyoda-ku, Tokyo (JP)

(72) Inventors: Hisashi Uchida, Kyoto (JP); Hirokazu Kubota, Otsu (JP); Toshimichi Iwai, Nara-ken (JP); Yuji Tanaka, Itami (JP); Hiroaki Kubo, Muko (JP); Hironori Harada, Amagasaki (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/133,910

(22) Filed: Sep. 18, 2018

(65) Prior Publication Data

US 2019/0098168 A1    Mar. 28, 2019

(30) Foreign Application Priority Data

Sep. 22, 2017   (JP) ................................ 2017-182223

(51) Int. Cl.
H04N 1/32        (2006.01)
(52) U.S. Cl.
CPC ..... H04N 1/32673 (2013.01); H04N 1/32635 (2013.01); H04N 1/32662 (2013.01); H04N 2201/0094 (2013.01)
(58) Field of Classification Search
CPC ........... H04N 1/32673; H04N 1/32635; H04N 1/32662; H04N 2201/0094

USPC ........................................................ 358/1.14
See application file for complete search history.

(56) References Cited

U.S. PATENT DOCUMENTS

| | | | |
|---|---|---|---|
| 7,966,167 B2 * | 6/2011 | Serizawa | G06F 17/5086 271/4.09 |
| 2006/0088323 A1 * | 4/2006 | Morisawa | G03G 15/5012 399/21 |
| 2010/0031261 A1 * | 2/2010 | Morita | H04N 1/00222 718/100 |

(Continued)

FOREIGN PATENT DOCUMENTS

JP    H09205429    8/1997

*Primary Examiner* — Allen H Nguyen
(74) *Attorney, Agent, or Firm* — Baker Hostetler

(57) ABSTRACT

A virtual execution device includes a hardware processor, the hardware processor forming a virtual device by simulating an image forming apparatus in operation, in the case where a predetermined allowing condition is unsatisfied by an operation state of the image forming apparatus, acquiring a plurality of respective jobs that have been externally received by the image forming apparatus before the allowing condition becomes unsatisfied by the operation state of the image forming apparatus as reference jobs, selecting one or more reference jobs as exclusion jobs from among the plurality of acquired reference jobs, causing the virtual device to process subject jobs that are not the one or more selected exclusion jobs among the plurality of acquired reference jobs, and in the case where the allowing condition is satisfied by an operation state of the virtual device, specifying the exclusion jobs as cause jobs that have caused errors in the image forming apparatus.

21 Claims, 16 Drawing Sheets

(56) References Cited

U.S. PATENT DOCUMENTS

2011/0063646 A1\* 3/2011 Maeda .................... G06F 9/445
358/1.13

\* cited by examiner

F I G. 3
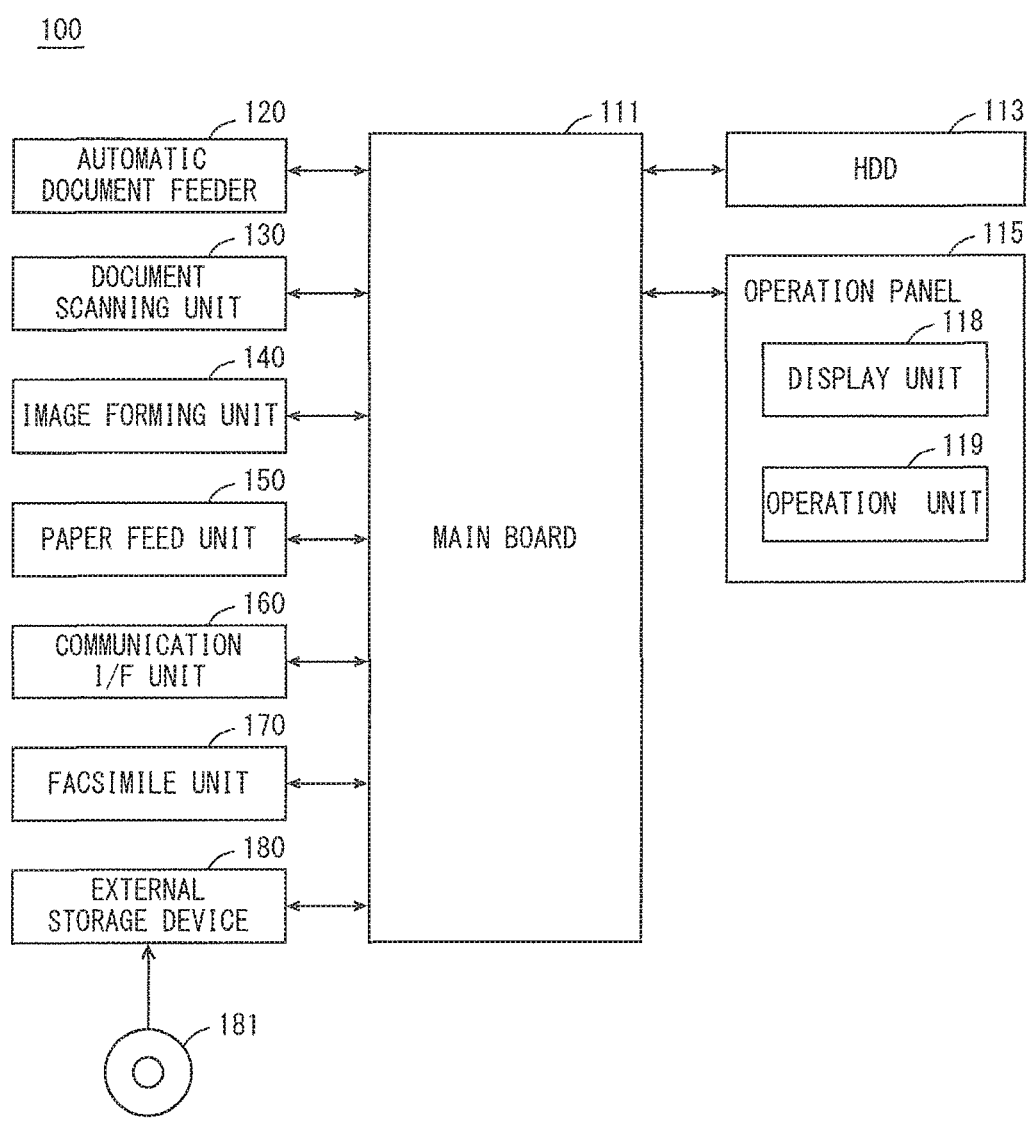

F I G. 4
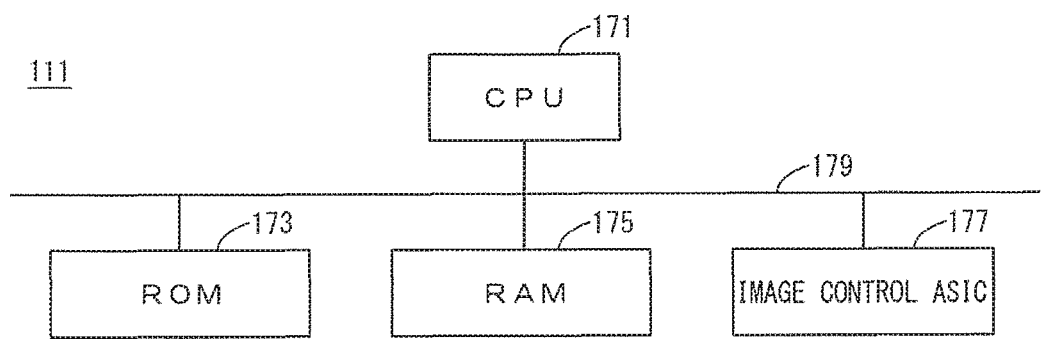

FIG. 8

| RECEPTION TIME POINT | PACKET | CONTENTS | JOB | TRANSMISSION SOURCE |
|---|---|---|---|---|
| ... | ... | ... | ... | ... |
| 8:07 | P1 | xxxxxxx | A | PC |
| 8:08 | P2 | xxxxxxx | A | PC |
| 8:10 | P3 | xxxxxxx | B | PC |
| 8:10 | P4 | xxxxxxx | B | PC |
| 8:11 | P5 | xxxxxxx | C | NETWORK DEVICE |
| 8:11 | P6 | xxxxxxx | C | NETWORK DEVICE |
| 8:13 | P7 | xxxxxxx | D | PC |
| 8:14 | P8 | xxxxxxx | D | PC |
| 8:17 | P9 | xxxxxxx | E | NETWORK DEVICE |
| 8:18 | P10 | xxxxxxx | E | NETWORK DEVICE |

REFERENCE JOBS: B, C, D, E

8:19 ALLOWING CONDITION BECOMES UNSATISFIED

SUBJECT RECEPTION PERIOD

VIRTUAL EXECUTION DEVICE, VIRTUAL EXECUTION METHOD AND NON-TRANSITORY COMPUTER READABLE RECORDING MEDIUM STORING VIRTUAL EXECUTION PROGRAM

Japanese Patent Application No. 2017-182223 filed on Sep. 22, 2017, is incorporated herein by reference in its entirety.

BACKGROUND

Technological Field

The present invention relates to a virtual execution device, a virtual execution method and a non-transitory computer readable recording medium storing a virtual execution program. More specifically, the present invention relates to a virtual execution device that simulates an image forming apparatus, a virtual execution method performed in the virtual execution device, and a non-transitory computer readable recording medium storing a virtual execution program which causes the hardware processor to perform the virtual execution method.

Description of the Related Art

For example, in Japanese Patent Laid-Open No. 9-205429, a network problem assessment device that is characterized in comprising a system state data production means for receiving a transmission frame on a data transmission path, and producing system state data based on the information acquired from the state of the transmission frame and the content of the transmission frame, in a network system having a plurality of nodes and a data transmission path connecting these nodes, an abnormality detection means for determining whether the contents of the system state data match any of preset abnormality phenomena, an abnormality cause prediction means for, in the case where the abnormality detection means determines that the contents of the system state data match one of the abnormality phenomena, selecting the predicted abnormality cause that corresponds to the abnormality phenomenon out of at least one preset abnormality cause, a simulator means for simulating behavior of the network system in the case where the network system has the predicted error cause, and an error cause determination means for comparing a simulation result of the simulator means with the contents of the system state data and determining true/false of the predicted error cause.

Generally, the data to be processed by a device is predetermined, and the program installed in the device is designed to be capable of processing the data. On the other hand, in the case where the device is connected to a network, the data that is received from another device may not be guaranteed to be compatible with the program installed in the device. In the case where processing the data that is not guaranteed to be compatible with the program, the device may not be able to process the data successfully, and an error may occur.

SUMMARY

According to one aspect of the present invention, a virtual execution device includes a hardware processor, the hardware processor forming a virtual device by simulating an image forming apparatus in operation, in the case where a predetermined allowing condition is unsatisfied by an operation state of the image forming apparatus, acquiring a plurality of respective jobs that have been externally received by the image forming apparatus before the allowing condition becomes unsatisfied by the operation state of the image forming apparatus as reference jobs, selecting one or more reference jobs as exclusion jobs from among the plurality of acquired reference jobs, causing the virtual device to process subject jobs that are not the one or more selected exclusion jobs among the plurality of acquired reference jobs, and in the case where the allowing condition is satisfied by an operation state of the virtual device, specifying the exclusion jobs as cause jobs that have caused errors in the image forming apparatus.

According to another aspect of the present invention, a virtual execution device includes a hardware processor, the hardware processor forming a virtual device by simulating an image forming apparatus in operation, in the case where a predetermined allowing condition is unsatisfied by an operation state of the image forming apparatus, acquiring jobs that have been externally received by the image forming apparatus before the allowing condition becomes unsatisfied by the operation state of the image forming apparatus as reference jobs, setting one or more virtual setting values that are produced when one or more setting values of a plurality of types of setting values set in the image forming apparatus are changed, in the virtual device, and causing the virtual device to process the reference jobs and determining whether the allowing condition is satisfied by operation states of the virtual device, specifying one or more virtual setting values with which the allowing condition is satisfied by operation states of the virtual device as target setting values, and setting the one or more specified target setting values in the image forming apparatus.

According to yet another aspect of the present invention, a virtual execution method includes virtually forming an image forming apparatus as a virtual device by simulating the image forming apparatus in operation, in the case where a predetermined allowing condition is unsatisfied by an operation state of the image forming apparatus, acquiring a plurality of respective jobs that have been externally received by the image forming apparatus before the allowing condition becomes unsatisfied by the operation state of the image forming apparatus as reference jobs, and selecting one or more reference jobs as exclusion jobs from the plurality of acquired reference jobs, causing the virtual device to process reference jobs that are not the one or more selected exclusion jobs as process subject jobs, and in the case where the allowing condition is satisfied by operation states of the virtual device, specifying the exclusion jobs as cause jobs that have caused errors in the image forming apparatus.

According to yet another aspect of the present invention, a non-transitory computer-readable recording medium is encoded with a virtual execution program, the virtual execution program causing a hardware processor to virtually form an image forming apparatus as a virtual device by simulating the image forming apparatus in operation, in the case where a predetermined allowing condition is unsatisfied by an operation state of the image forming apparatus, acquire a plurality of respective jobs that have been externally received by the image forming apparatus before the allowing condition becomes unsatisfied by the operation state of the image forming apparatus, and select one or more reference jobs as exclusion jobs from the plurality of acquired reference jobs, causes the virtual device to process subject jobs that are not the one or more selected exclusion jobs among the plurality of acquired reference jobs, and in the case where the allowing condition is satisfied by an operation state of the virtual device, the virtual execution program causes the hardware processor to specify the exclusion jobs as cause jobs that have caused errors in the image forming apparatus.

According to yet another aspect of the present invention, a non-transitory computer-readable recording medium is encoded with a virtual execution program, the virtual execution program causing a hardware processor to virtually form an image forming apparatus as a virtual device by simulating the image forming apparatus in operation, in the case where a predetermined allowing condition is unsatisfied by an operation state of the image forming apparatus, acquire jobs that have been externally received by the image forming apparatus before the allowing condition becomes unsatisfied by the operation state of the image forming apparatus as reference jobs, set one or more virtual setting values that are produced when one or more setting values of a plurality of types of setting values set in the image forming apparatus are changed, in the virtual device, and process the reference jobs and determine whether the allowing condition is satisfied by operation states of the virtual device, specify one or more virtual setting values with which the allowing condition is satisfied by operation states of the virtual device as target setting values, and set the one or more specified target setting values in the image forming apparatus.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 3 is a block diagram showing one example of an outline of a hardware configuration of an MFP in the first embodiment;

FIG. 4 is a block diagram showing one example of a detailed configuration of a main board in the first embodiment;

FIG. 8 is a diagram showing one example of a job received by an MFP in the first embedment;

DETAILED DESCRIPTION OF EMBODIMENTS

Figure 1:
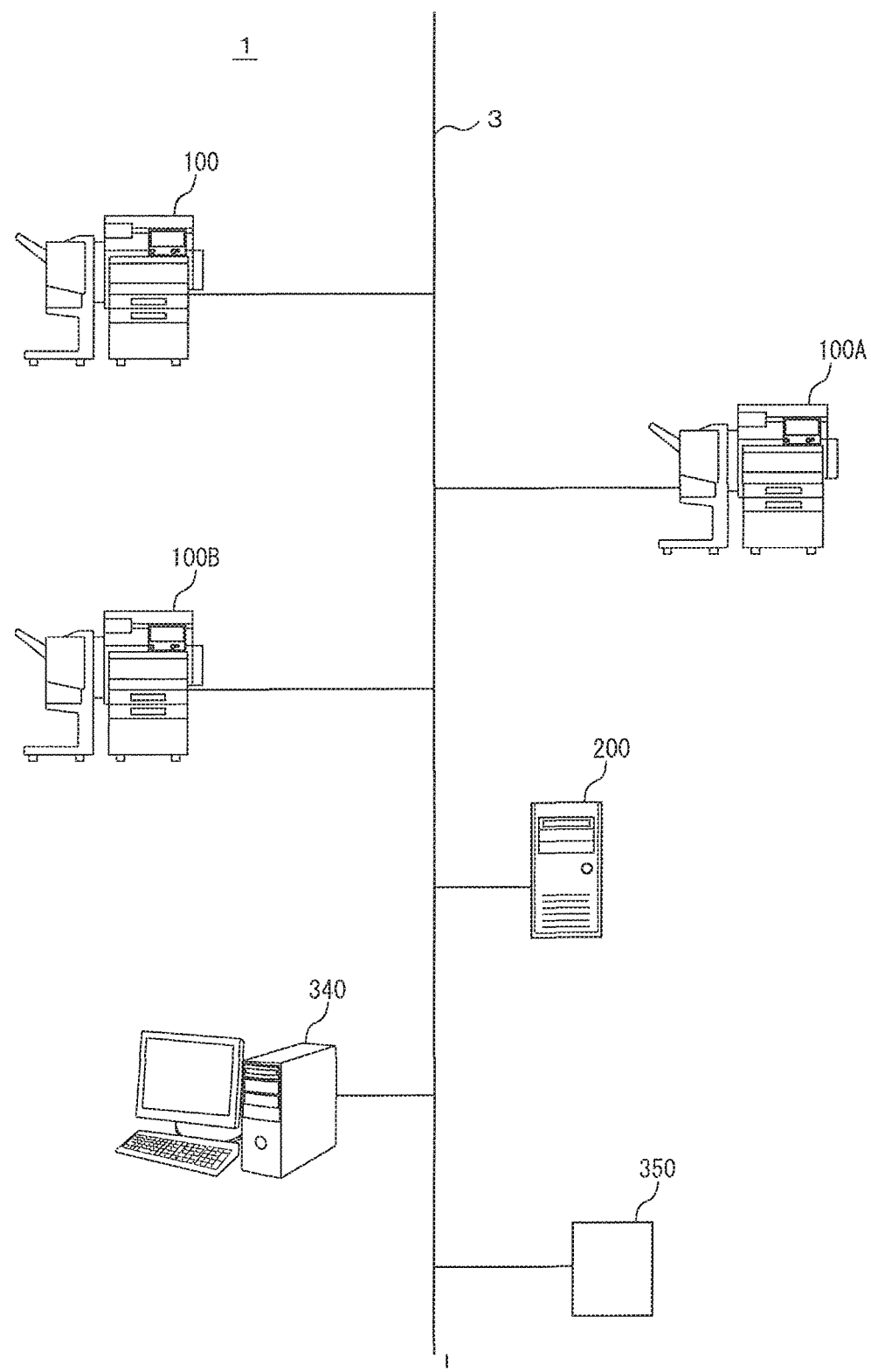
FIG. 1 is a diagram showing one example of an overview of an information processing system in a first embodiment.

Hereinafter, one or more embodiments of the present invention will be described with reference to the drawings. However, the scope of the invention is not limited to the disclosed embodiments.

Embodiments of the present invention will be described below with reference to the drawings. In the following description, the same parts are denoted with the same reference characters. Their names and functions are also the same. Thus, a detailed description thereof therefore will not be repeated.

FIG. 1 is a diagram showing one example of an overview of an information processing system in one of embodiments of the present invention. Referring to FIG. 1, an information processing system 1 includes MFPs (Multi Function Peripherals) 100, 100A, 100B, a server 200, a personal computer (PC) 340 and a network device 350.

The MFPs 100, 100A, 100B are one example of an image forming apparatus, and includes at least an image forming function of forming an image on a recording medium such as a sheet of paper based on image data. In addition to the image forming function, the MFPs 100, 100A, 100B may include a document scanning function of scanning a document and a facsimile transmission reception function of transmitting and receiving facsimile data. The server 200 and the PC 340 are general computers. The network device 350 is a router or a hub, for example, and relays the transmission and reception of data.

The server 200, the PC 340, the network device 350 and the MFPs 100, 100A, 100B are respectively connected to a network 3. The network 3 is a Local Area Network (LAN), either wired or wireless. The network 3 may further be connected to the Internet. In this case, the server 200, the PC 340 and the MFPs 100, 100A, 100B can respectively communicate with the computer connected to the Internet via the network 3. Further, the network 3 is not limited to a LAN and may be a network using Public Switched Telephone Networks. Further, the network 3 may be a Wide Area Network (WAN) such as the Internet.

Figure 2:
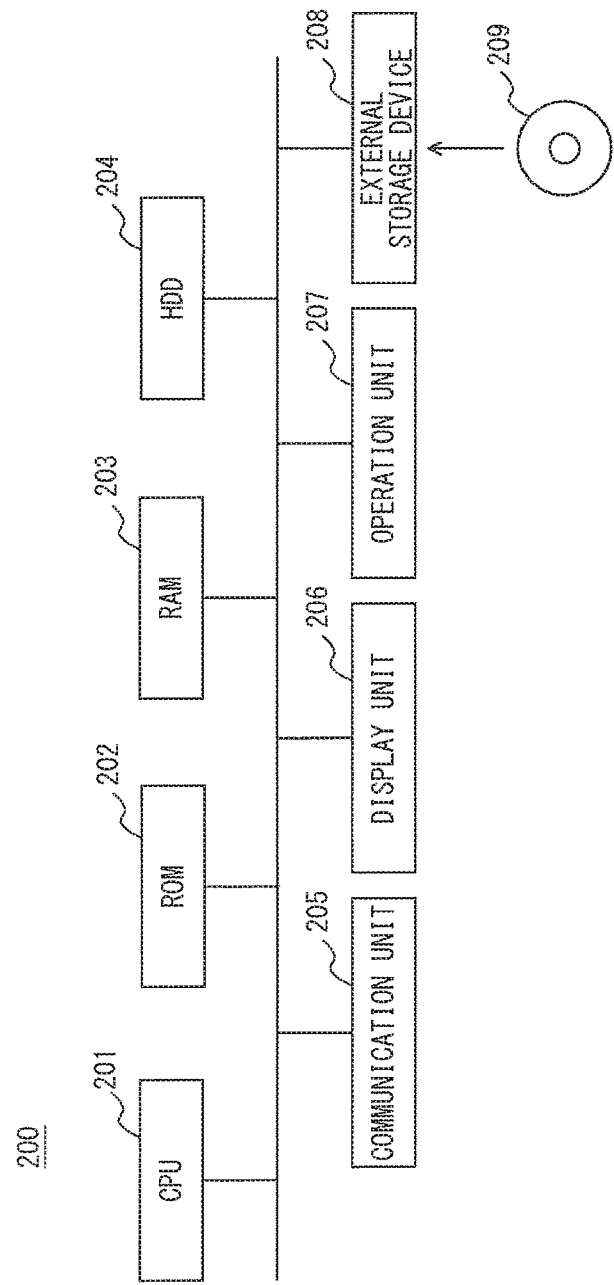
FIG. 2 is a block diagram showing one example of an outline of a hardware configuration of a server in the first embodiment.

FIG. 2 is a block diagram showing one example of an outline of a hardware configuration of the server in the present embodiment. Referring to FIG. 2, the server 200 includes a Central Processing Unit (CPU) 201 for controlling the server 200 as a whole, a ROM (Read Only Memory) 202 for storing a program to be executed by the CPU 201, a RAM (Random Access Memory) 203 that is used as a work area of the CPU 201, a Hard Disc Drive (HDD) 204 that stores data in a non-volatile manner, a communication unit 205 that connects the CPU 201 to the network 3, a display unit 206 that displays information, an operation unit 207 that accepts an input operation by a user and an external storage device 208.

The display unit 206 is a display device such as a Liquid Crystal Display (LCD) device and an organic ELD (Electro-Luminescence Display). The operation unit 207 is hard keys such as a keyboard. Further, the operation unit 207 may be a touch panel. The touch panel is superimposed on an upper surface or a lower surface of the display unit 206. The touch panel detects the position designated by the user in a display surface of the display unit 206.

The communication unit 205 is an interface for connecting the CPU 201 to the network 3. The communication unit 205 communicates with the MFPs 100, 100A, 100B connected to the network using a communication protocol such as a TCP (Transmission Control Protocol) or a UDP (User Datagram Protocol). The protocol for communication is not limited in particular, and any protocol can be used. When IP (Internet Protocol) addresses of the respective MFPs 100, 100A, 100B are registered in the server 200, the server 200 can communicate with the respective MFPs 100, 100A, 100B, and can transmit and receive data.

The HDD 204 stores the program executed by the CPU 201 and the data necessary for the execution of the program. The CPU 201 loads the program recorded in the HDD 204 into the RAM 203 for execution.

The external storage device 208 is mounted with a CD-ROM (Compact Disk ROM) 209 storing a program. The CPU 201 is capable of accessing the CD-ROM 209 via the external storage device 208. The CPU 201 loads the program, recorded in the CD-ROM 209 which is mounted on the external storage device 208, into the RAM 203 for execution. It is noted that the medium for storing the program executed by the CPU 201 is not limited to the CD-ROM 209. It may be an optical disc (MO (Magnetic Optical Disc)/MD (Mini Disc)/DVD (Digital Versatile Disc)), an IC card, an optical card, and a semiconductor memory such as a mask ROM and an EPROM (Erasable Programmable ROM).

Further, the program executed by the CPU 201 is not limited to a program recorded in the CD-ROM 209, and the CPU 201 may load a program, stored in the HDD 204, into RAM 203 for execution. In this case, another computer connected to the network 3 may rewrite the program stored in the HDD 204, or may additionally write a new program therein. Further, the server 200 may download a program from another computer connected to the network 3 or the Internet, and store the program in the HDD 204. The program referred to here includes not only a program directly executable by the CPU 201 but also a source program, a compressed program, an encrypted program or the like.

Since the hardware configuration and functions of the MFPs 100, 100A, 100B are the same, the MFP 100 is described here as an example. FIG. 3 is a block diagram showing one example of the outline of the hardware configuration of the MFP in the present embodiment. Referring to FIG. 3, the MFP 100 includes a main board 111, a document scanning unit 130 for scanning a document, an automatic document feeder 120 for conveying a document to the document scanning unit 130, an image forming unit 140 for forming an image on a sheet of paper or other medium based on image data output by the document scanning unit 130 that has scanned a document, a paper feed unit 150 for supplying sheets of paper to the image forming unit 140, a communication interface (I/F) unit 160, a facsimile unit 170, an external storage device 180, a hard disc drive (HDD) 113 as a mass storage device and an operation panel 115 serving as a user interface.

The main board 111 is connected to the automatic document feeder 120, the document scanning unit 130, the image forming unit 140 and the paper feed unit 150, the communication I/F unit 160, the facsimile unit 170, the external storage device 180, the HDD 113 and the operation panel 115, and controls the entire MFP 100.

The automatic document feeder 120 automatically transports a plurality of documents set on a document feed tray to a predetermined document scanning position set on a platen glass of the document scanning unit 130 one by one, and discharges the document, the image of which has been scanned by the document scanning unit 130, onto a document discharge tray. The document scanning unit 130 includes a light source that irradiates the document that has been transported to the document scanning position with light, and an optoelectronic transducer that receives the light reflected by the document and scans the document image according to a size of the document. The optoelectronic transducer converts the received light into image data, which is an electric signal, and outputs the image data to the image forming unit 140.

The paper feed unit 150 conveys sheets of paper stored in the paper feed tray to the image forming unit 140. The image forming unit 140 forms an image by a well-known electrophotographic method. The image forming unit 140 forms an image on the sheet of paper that has been conveyed by the paper feed unit 150, based on the processed image data obtained when various data processing such as shading correction is performed on the image data received from the document scanning unit 130 or the externally received image data, and discharges the sheet of paper having an image formed thereon to the discharge tray.

The communication I/F unit 160 is an interface for connecting the MFP 100 to the network 3. The communication I/F unit 160 communicates with another computer connected to the network using a communication protocol such as a TCP or a UDP. The protocol for communication is not limited in particular, and any protocol can be used.

The communication I/F unit 160 outputs the data received from the network 3 to the main board 111, and outputs the data received from the main board 111 to the network 3. The communication I/F unit 160 outputs only the data, that is addressed to the MFP 100 out of the data received from the network 3, to the main board 111, and discards the data addressed to a device different from the MFP 100 out of the data received from the network 3.

The facsimile unit 170 is connected to the Public Switched Telephone Networks (PSTN), and transmits and receives facsimile data. The external storage device 180 is mounted with a CD-ROM 181 or a semiconductor memory. The external storage device 180 reads out the data stored in the CD-ROM 181 or the semiconductor memory. The external storage device 180 stores the data in the CD-ROM 181 or the semiconductor memory.

The operation panel 115 is provided on an upper surface of the MFP 100, and includes the display unit 118 and the operation unit 119. The display unit 118 is a display device such as a Liquid Crystal Display (LCD) device or an organic ELD, and displays instruction menus to users, information about the acquired image data, and the like. The operation unit 119 includes a plurality of hard keys and a touch panel. The touch panel is a multi-touch-capable panel superimposed on an upper surface or a lower surface of the display unit 118 and detects the position designated by the user in the display surface of the display unit 118.

FIG. 4 is a block diagram showing one example of a detailed configuration of the main board in the present embodiment. Referring to FIG. 4, the main board 111 includes a CPU 171, a ROM 173, a RAM 175 and an image control ASIC (Application Specific Integrated Circuit) 177.

The CPU 171, the ROM 173, the RAM 175 and the image control ASIC 177 are respectively connected to a bus 179 and can transfer data. The CPU 171 controls the entire MFP 100. The ROM 173 stores the program executed by the CPU 171. The RAM 175 is a volatile semiconductor memory that is used as a work area of the CPU 171.

The CPU 171 loads the program stored in the HDD 113 into the RAM 175 for execution. The program executed by the CPU 171 includes a control program for controlling hardware resources and an application program. The hardware resources include the automatic document feeder 120, the document scanning unit 130, the image forming unit 140, the paper feed unit 150, the communication I/F unit 160, the facsimile unit 170, the HDD 113 and the operation panel 115. The application program includes a facsimile transmission program for controlling the facsimile unit 170 and transmitting facsimile data, a facsimile reception program for controlling the facsimile unit 170 and receiving facsimile data, a print program for controlling the communication I/F unit 160 and receiving a print job, and controlling the image forming unit 140 and the paper feed unit 150 and forming an image based on the print job, and a document scanning program for controlling the document scanning unit 130 and scanning a document. Further, the application program may include a maintenance program for managing consumables included in the MFP 100 and an error state notification program for making notification of an error state. The application program executed by the CPU 171 is not limited to these.

The image control ASIC 177 is connected to and controls the automatic document feeder 120, the document scanning unit 130, the image forming unit 140 and the paper feed unit 150. Further, the image control ASIC 177 has a function of performing predetermined image processing on the image data output by the document scanning unit 130 that has scanned a document, and a function of converting the image data into raster data for printing by the image forming unit 140.

The server 200 in the present embodiment includes a simulator that simulates the MFPs 100, 100A, 100B. Since the server 200 simulates the respective MFPs 100, 100A, 100B in the same manner, the case where the server 200 simulates the MFP 100 will be described here as an example.

Figure 5:
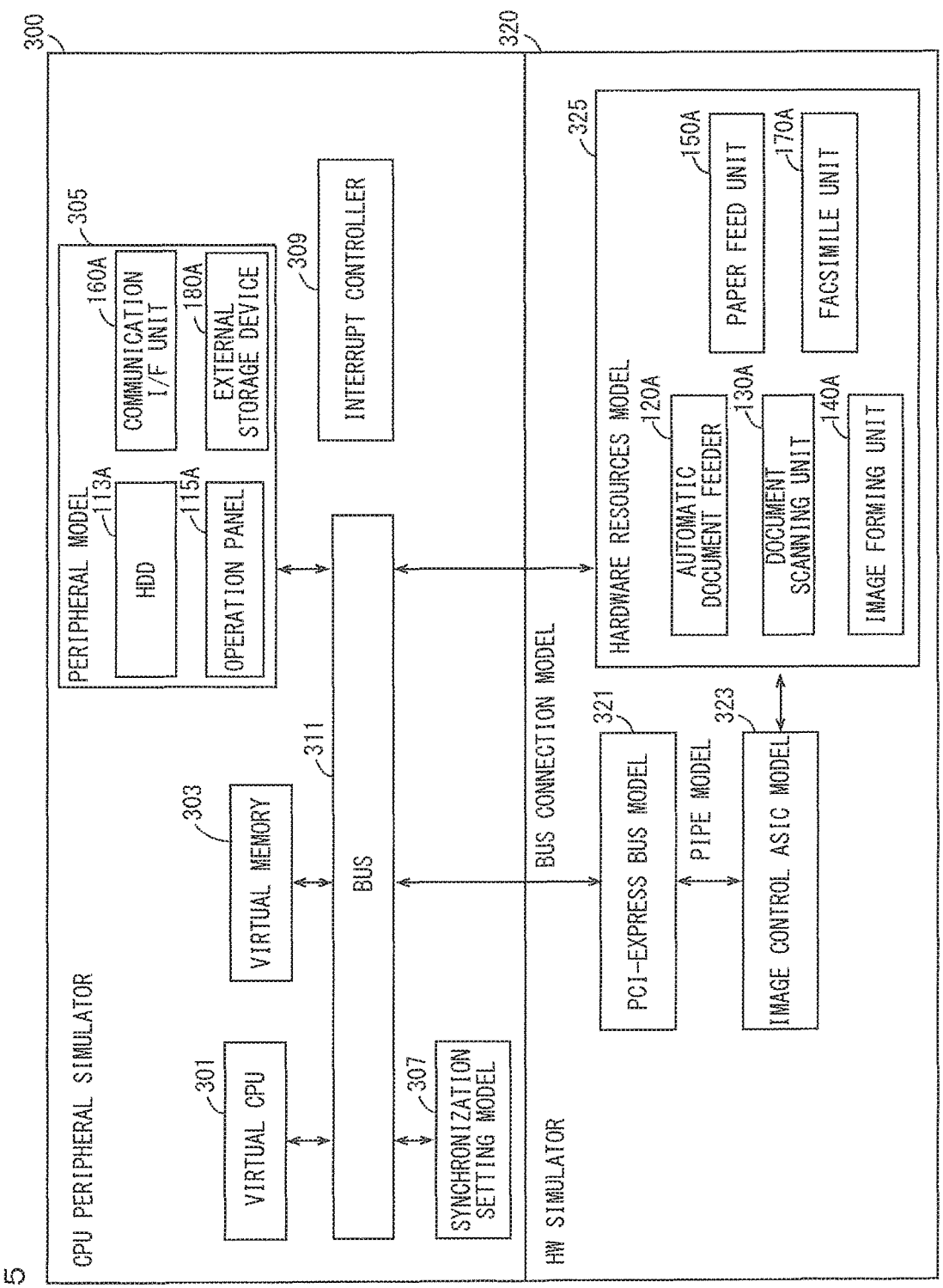
FIG. 5 is a diagram showing one example of an outline of a simulator included in the server in the first embodiment.

FIG. 5 is a diagram showing one example of the outline of the simulator included in the server. This simulator is formed in the CPU 201 when the CPU 201 executes a simulate program. Referring to FIG. 5, the simulator includes a CPU peripheral simulator 300 and a hardware (HW) simulator 320. The CPU peripheral simulator 300 includes a virtual CPU 301 that simulates the CPU 171 included in the MFP 100, a virtual memory 303 that emulates the ROM 173 and the RAM 175, a peripheral model 305, a synchronization setting model 307 and an interrupt controller 309. The virtual CPU 301, the virtual memory 303, the peripheral model 305 and the synchronization setting model 307 are connected to a Bus 311.

The peripheral model 305 includes an HDD 113A, an operation panel 115A, a communication I/F unit 160A and an external storage device 180A that emulate the HDD 113, the operation panel 115, the communication I/F unit 160 and the external storage device 180 that are included in the MFP 100, respectively.

The synchronization setting model 307 makes settings such that the virtual CPU 301 synchronizes with the virtual memory 303 and the peripheral model 305. When the settings are made in order for the virtual CPU 301 to synchronize with the virtual memory 303 and the peripheral model 305, the interrupt controller 309 produces an interrupt in the virtual CPU 301.

The HW simulator 320 includes a PCI-Express Bus model 321 and an image control ASIC model 323 and a hardware resources model 325. The PCI-Express Bus model 321 is connected to the bus 311 and emulates the connection in accordance with the PCI-Express standard. The image control ASIC model 323 emulates the image control ASIC 177 included in the MFP 100. The hardware resources model 325 emulates the hardware resources included in the MFP 100. Specifically, the hardware resources model 325 includes an automatic document feeder 120A, a document scanning unit 130A, an image forming unit 140A, a paper feed unit 150A and a facsimile unit 170A that emulate the automatic document feeder 120, the document scanning unit 130, the image forming unit 140, the paper feed unit 150 and the facsimile unit 170 that are included in the MFP 100, respectively.

Figure 6:
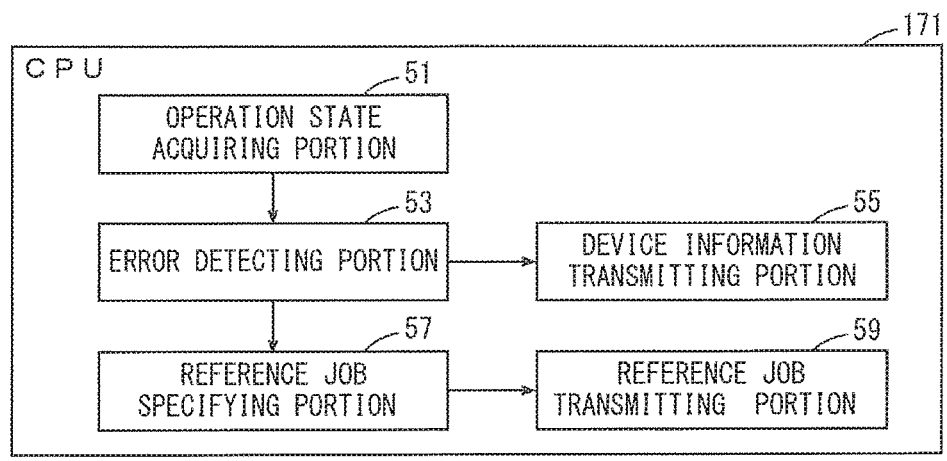
FIG. 6 is a block diagram showing one example of functions of a CPU included in the MFP in the first embodiment.

FIG. 6 is a block diagram showing one example of the functions of the CPU included in the MFP in the first embodiment. The functions shown in FIG. 6 are implemented by the CPU 171 in the case where the CPU 171 included in the MFP 100 executes an error notification program stored in the ROM 173, the HDD 113 or the CD-ROM 181. The error notification program is part of a virtual execution program. Referring to FIG. 6, the CPU 171 includes an operation state acquiring portion 51, an error detecting portion 53, a device information transmitting portion 55, a reference job specifying portion 57 and a reference job transmitting portion 59.

The operation state acquiring portion 51 acquires an operation state of the MFP 100. The operation state of the MFP 100 corresponds to the entire load on the CPU 171 included in the MFP 100. Here, the operation state acquiring portion 51 acquires the utilization rate of the CPU 171 as an operation state. The utilization rate of the CPU 171 is the proportion of the time required for the CPU 171 to execute a task of executing a job. The operation state acquiring portion 51 may acquire a response time from the time when an operation of inputting by the user is accepted to the time when the process corresponding to the operation ends as an operation state. Alternatively, the operation state acquiring portion 51 may acquire the utilization rate of the RAM 175 and the number of swaps in which the data is transferred between the swap regions of the RAM 175 and the HDD 113 as an operation state. The operation state acquiring portion 51 outputs the acquired operation state to the error detecting portion 53.

The error detecting portion 53 determines whether a predetermined allowing condition is unsatisfied by the operation state of the MFP 100 that is received from the operation state acquiring portion 51. In the case where the allowing condition is unsatisfied by the operation state of the MFP 100, the error detecting portion 53 detects an error, and outputs an error signal to the device information transmitting portion 55 and the reference job specifying portion 57. Here, in the case where the utilization rate of the CPU 171 exceeds a predetermined upper limit value, the error detecting portion 53 determines that the predetermined allowing condition is unsatisfied by the operation state of the MFP 100. The predetermined allowing condition is that the utilization rate of the CPU 171 is equal to or lower than an upper limit value. In the case where the utilization rate of the CPU 171 exceeds the upper limit value, an error is detected, and the error detecting portion 53 outputs an error signal to the device information transmitting portion 55 and the reference job specifying portion 57.

The predetermined allowing condition may be that the response time is shorter than a specified time period. In this case, when the response time reaches the specified time period, the allowing condition becomes unsatisfied by the operation state of the MFP 100. Thus, a time-out error occurs. In the case where the CPU 171 receives a second job in the middle of execution of a first job by the CPU 171, the utilization rate at which the CPU 171 is utilized by a second task of receiving the second job is increased. Thus, the utilization rate at which the CPU 171 is utilized by a first task of executing the first job is lowered relatively. In this case, there may be a delay with the process of the first task, and the response time may reach the specified time period. Further, the utilization rate at which the CPU 171 is utilized by the first task of executing the first job received in a certain period is increased, whereby the utilization rate at which the CPU 171 is utilized by the second task of executing the second job received in the period is lowered relatively. In this case, there may be a delay with the process of the second task, and the response time may reach the specified time period.

In the case where the device information transmitting portion 55 receives an error signal from the error detecting portion 53, that is, the case where the allowing condition becomes unsatisfied by the operation state of the MFP 100, the device information transmitting portion 55 controls the communication I/F unit 160 and transmits the device information of the MFP 100 to the server 200. The device information includes a model name of the CPU 171 provided in the MFP 100, hardware information relating to the hardware resources installed in the MFP 100, software information relating to the software resources installed in the MFP 100, and a setting value set in the MFP 100.

In the case where the reference job specifying portion 57 receives an error signal from the error detecting portion 53, that is, the case where the allowing condition becomes unsatisfied by the operation state of the MFP 100, the reference job specifying portion 57 specifies jobs received externally before the allowing condition becomes unsatisfied by the operation state as reference jobs, and outputs the specified reference jobs to the reference job transmitting portion 59. Specifically, the reference job specifying portion 57 specifies an error occurrence time point (a time point at which an error signal is received) as an end point, specifies a time point that precedes the error occurrence time point by a predetermined time period as a start point, and specifies a period from the start point to the end point as a subject reception period. The reference job specifying portion 57 specifies a plurality of jobs received by the communication I/F unit 160 in the subject reception period as reference jobs. The reference job transmitting portion 59 controls the communication I/F unit 160 and transmits the plurality of reference jobs received from the reference job specifying portion 57 to the server 200.

The reference jobs specified by the reference job specifying portion 57 are the jobs received from an external device and include a job that has caused an increase in load on the CPU 171. The external device is the PC 340 or the network device 350, for example. The data received from the external device includes the data that is received from the external device and stored in the HDD 113. The program executed by the CPU 171 is designed to be capable of reliably processing the data produced by the MFP 100 such as the data that is output by the document scanning unit 130 that has scanned a document, for example. This is because the program for controlling the document scanning unit 130 and the program for processing the data output by the document scanning unit 130 are designed to be compatible with each other. On the other hand, the program executed by the CPU 171 may not be designed to be compatible with the data received from an external device. For example, the program may not be compatible with a format of the externally received data.

Figure 7:
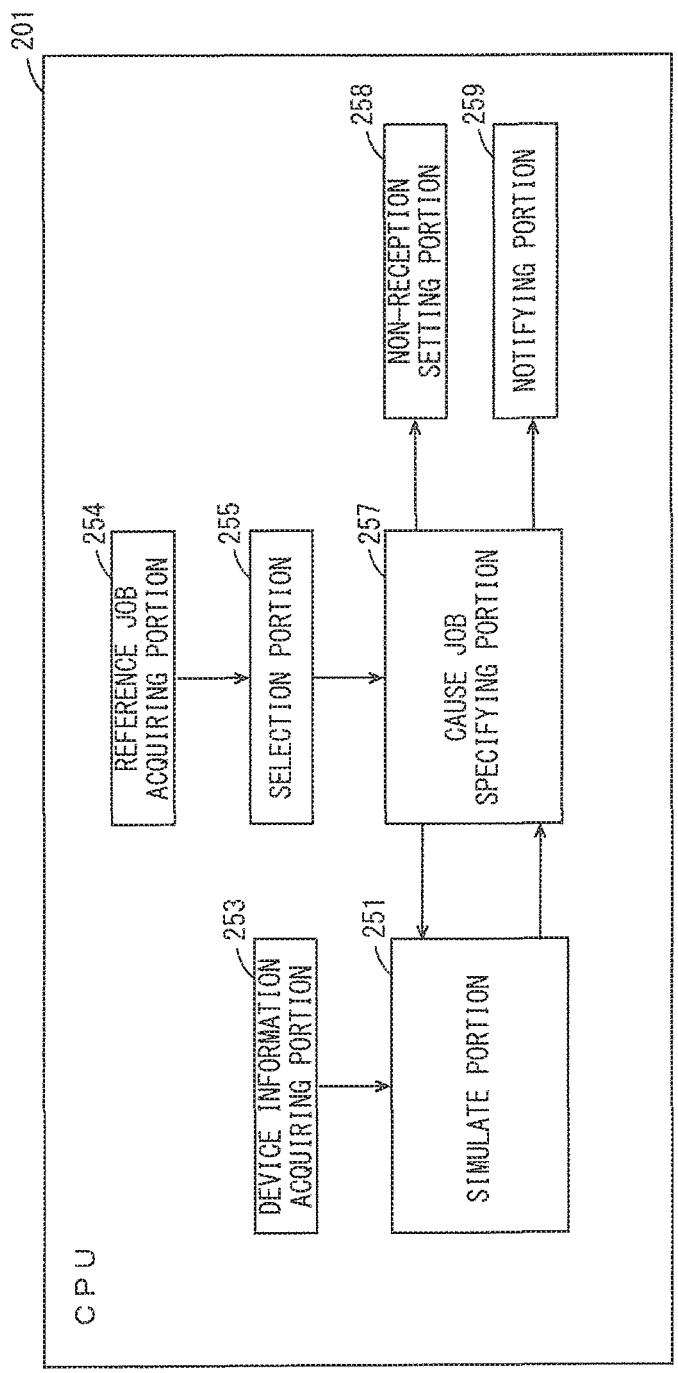
FIG. 7 is a block diagram showing one example of functions of a CPU included in the server in the first embodiment.

FIG. 7 is a block diagram showing one example of the functions of the CPU included in the server in the first embodiment. The functions shown in FIG. 7 are implemented by the CPU 201 in the case where the CPU 201 included in the server 200 executes the virtual execution program stored in the ROM 202, the HDD 204 or the CD-ROM 209.

Referring to FIG. 7, the CPU 201 included in the server 200 includes a simulate portion 251, a device information acquiring portion 253, a reference job acquiring portion 254, a selection portion 255, a cause job specifying portion 257, a non-reception setting portion 258 and a notifying portion 259.

The device information acquiring portion 253 acquires the device information from one of the MFPs 100, 100A, 100B. As described above, in the case where an error occurs, one of the MFPs 100, 100A, 100B transmits device information and a plurality of reference jobs. When the communication unit 205 receives the device information from one of the MFPs 100, 100A, 100B, the device information acquiring portion 253 acquires the device information received by the communication unit 205. Here, the case where the communication unit 205 acquires the device information from the MFP 100 is described as an example. In the case where the device information acquiring portion 253 acquires the device information from the MFP 100, the MFP 100 is set as an error subject (a device in which an error has occurred). The device information includes a model name of a Central Processing Unit provided in the device, the hardware information relating to the hardware resources installed in the device, the software information relating to the software resources installed in the device and a setting value. The setting value influences the load of a task executed by the CPU 171 included in the MFP 100 that is to an error subject. For example, the setting value is the size of a processing area of the CPU 171 that is secured in the RAM 175 (hereinafter referred to as a "buffer size").

When the communication unit 205 receives a plurality of reference jobs from one of the MFP 100, 100A, 100B, the reference job acquiring portion 254 acquires the plurality of reference jobs received by the communication unit 205. In the case where the MFP 100 is an error subject, the reference jobs are the jobs that have been received by the MFP 100 from an external device in the subject reception period, and the reference job acquiring portion 254 acquires the reference jobs from the MFP 100. In the case where acquiring the reference jobs, the reference job acquiring portion 254 outputs the reference jobs to the selection portion 255.

The simulate portion 251 simulates the MFP 100 that is the error subject based on the device information received from the device information acquiring portion 253. The simulate portion 251 makes settings of the hardware resources mounted on the MFP 100 that is an error subject, causes the virtual CPU 301 to execute the software resources executed by the CPU 171 of the MFP 100, sets a setting value, and causes the virtual CPU 301 to execute a job executed in the CPU 171 of the MFP 100.

The MFP 100 includes the image control ASIC 177, the automatic document feeder 120, the document scanning unit 130, the image forming unit 140, the paper feed unit 150, the communication I/F unit 160, the facsimile unit 170, the external storage device 180, the HDD 113 and the operation panel 115 as hardware resources. Therefore, the hardware information included in the device information defines the image control ASIC 177, the automatic document feeder 120, the document scanning unit 130, the image forming unit 140, the paper feed unit 150, the communication I/F unit 160, the facsimile unit 170, the external storage device 180, the HDD 113 and the operation panel 115 as the hardware resources. The simulate portion 251 makes settings of the emulator that respectively emulates the image control ASIC 177, the automatic document feeder 120, the document scanning unit 130, the image forming unit 140, the paper feed unit 150, the communication I/F unit 160, the facsimile unit 170, the external storage device 180, the HDD 113 and the operation panel 115 that are defined by the hardware information included in the device information. Further, the simulate portion 251 makes settings such that the virtual CPU 301 is synchronized with the emulator of the hardware resources in the MFP 100. For example, the simulate portion 251 causes the synchronization setting model 307 of the CPU peripheral simulator 300 shown in FIG. 5 to make settings of a register value of the virtual CPU 301 such that the virtual CPU 301 is synchronized with the emulator of the hardware resources, and rewrites a memory map of the virtual memory 303.

Further, the simulate portion 251 sets the software resources, defined by the software information included in the device information, in a state where the software resources are run by the virtual CPU, and sets the setting value included in the device information. Specifically, the simulate portion 251 installs the software resources defined by the software information included in the device information, and sets the setting value included in the device information. In this manner, the simulate portion 251 simulates the MFP 100, thereby virtually forming the MFP 100 as a virtual device. The data stored in the RAM 175 of the MFP 100 may be acquired as a snapshot and stored in the virtual memory 303.

Because simulating the MFP 100 in response to reception of the device information by the device information acquiring portion 253 from one of the MFPs 100, 100A, 100B, for example, the MFP 100, the simulate portion 251 does not simulate the MFP 100 until the device information acquiring portion 253 receives the device information from the MFP 100. Therefore, the load on the CPU 201 of the server 200 can be reduced as much as possible.

In addition to the MFP 100 that is an error subject, the simulate portion 251 may simulate an external device connected to the MFP 100. For example, the device information received by the simulate portion 251 from the device information acquiring portion 253 includes a setting value relating to the external device. In that case, the simulate portion 251 can acquire the setting value relating to the external device from the device information, and can simulate the external device based on the acquired setting value. Alternatively, in the case where the reference job acquired by the reference job acquiring portion 254 includes a setting value relating to the external device that is the source of transmission, the reference job acquiring portion 254 may output the reference job to the simulate portion 251, and the simulate portion 251 may acquire the setting value relating to the external device from the reference job, and may simulate the external device based on the acquired setting value.

In response to reception of a plurality of reference jobs from the reference job acquiring portion 254, the selection portion 255 makes a selection of one or more exclusion jobs from the plurality of received reference jobs, and outputs the reference jobs that are not the exclusion jobs among the plurality of received reference jobs to the cause job specifying portion 257 as process subject jobs (jobs to be processed). In the present example, the selection portion 255 sequentially makes selections of one or more exclusion jobs from the plurality of reference jobs, and sequentially outputs the reference jobs that are not in the selections of exclusion jobs among the plurality of received reference jobs as the process subject jobs. For example, the case where the MFP 100 that is the error subject receives N (N is a positive integer) job(s) in the target reception period will be described as an example. In this case, the selection portion 255 receives N reference job(s) from the reference job acquiring portion 254. The selection portion 255 first selects the reference job that is received by the MFP 100 the earliest out of the N reference job(s) as an exclusion job, and outputs the remaining (N−1) reference job(s) to the cause job specifying portion 257 as (a) process subject job(s). Next, the selection portion 255 selects the reference job that is received by the MFP 100 the second earliest out of the N reference job(s) as an exclusion job, and outputs the remaining (N−1) reference job(s) to the cause job specifying portion 257 as process subject job(s). After that, the selection portion 255 similarly makes selections of (an) exclusion job(s) one by one out of the N reference job(s) and outputs the remaining (N−1) reference job(s) to the cause job specifying portion 257 as (a) process subject job(s). Thus, (an) N exclusion job(s) is/are sequentially selected from (an) N reference job(s), and (an) N selection(s) of process subject jobs are sequentially output. The selection order and the number of selections of exclusion jobs may be predetermined or may be designatable by the user.

In response to reception of process subject jobs from the selection portion 255, the cause job specifying portion 257 causes the virtual device formed by the simulate portion 251 to process the received process subject jobs. In the case where the allowing condition is satisfied by the operation states of the virtual device that processes the process subject jobs, that is, the case where no error occurs in the virtual device, the cause job specifying portion 257 specifies the exclusion job as a cause job. The cause job is the job that causes an error (abnormality) to occur in the MFP 100 that is an error subject. In the present example, every time the selection portion 255 makes a selection of one or more exclusion jobs, the cause job specifying portion 257 causes the virtual device to process the process subject jobs, and determines whether the allowing condition is satisfied by the operation state of the virtual device. In the case where the allowing condition is satisfied by the operation states of the virtual device in the process of the process subject jobs that respectively correspond to a plurality of selections of exclusion jobs, the cause job specifying portion 257 specifies the one or more exclusion jobs included in the selection of exclusion jobs as cause jobs, that correspond to the process subject jobs requiring the shortest processing time per unit data amount to be processed by the virtual device, among the plurality of selections of exclusion jobs.

For example, in the case where sequentially receiving (an) N selection(s) of process subject jobs from the selection portion 255, the cause job specifying portion 257 causes the virtual device to process each of the process subject jobs in the N selection(s), and determines whether the allowing condition is satisfied by the operation state of the virtual device regarding each of the process subject jobs in the N selection(s). Further, the cause job specifying portion 257 measures the time required for the process of the process subject jobs in the N selection(s) by the virtual device. In the case where the allowing condition is satisfied by the operation state of the virtual device during the process of the process subject jobs in M selection(s) (M is a positive integer and equal to or smaller than N), the cause job specifying portion 257 calculates the processing time per unit data amount by dividing the processing time by the data amount regarding each of the process subject jobs in the M selection(s), and specifies the selection of the process subject jobs that has the shortest calculated processing time. The cause job specifying portion 257 specifies the reference job (exclusion job) that is not the process subject jobs included in the specified selection as a cause job. The cause job specifying portion 257 outputs the specified cause job to the non-reception setting portion 258 and the notifying portion 259.

In response to reception of the cause job from the cause job specifying portion 257, the non-reception setting portion 258 makes settings of the MFP 100 that is an error subject such that the MFP 100 does not to receive the same type of jobs as the cause job. In this case, the cause job specified by the cause job specifying portion 257 is compared to the other one or more reference jobs, whereby the part of the cause job that is different from all of the other one or more reference jobs is specified. Thus, the job including the different part is the same type of a job as the cause job. For example, in the case where there is a specific item, that is set in the cause job but not set in any of the other one or more reference jobs, out of a plurality of items defined by a print condition included in the job, the job with the set specific item is the same type of a job as the cause job.

The non-reception setting portion 258 controls the communication unit 205 and transmits a setting command including job type identification information for identifying a type of the cause job to the MFP 100. When receiving the setting command transmitted from the server 200, the MFP 100 sets the job type specified by the job type identification information included in the setting command as a reception rejection subject. In this case, the MFP 100 does not receive the job, the type of which is the reception rejection subject, from among jobs transmitted from the external device after receiving the setting command from the server 200.

The non-reception setting portion 258 may make settings of the MFP 100 that is an error subject such that the MFP 100 does not receive a job from the external device that has transmitted a cause job. For example, each of the jobs transmitted from external devices to the MFP 100 includes the device identification information for identifying the external devices that are the sources of transmission. The non-reception setting portion 258 acquires the device identification information included in the cause job, and transmits the setting command including the acquired device identification information to the MFP 100. When receiving the setting command transmitted from the server 200, the MFP 100 sets the job transmitted from the external device specified by the device identification information included in the setting command as a reception rejection subject.

There is an environment of the network 3 to which the MFP 100 is connected as an environment in which the MFP 100 is utilized. The external devices connected to the network 3 change, and the data transmitted by the connected external devices to the MFP 100 is defined by the external devices. Therefore, the external device that has transmitted a cause job may retransmit a job that causes the allowing condition to become unsatisfied by the MFP 100. It is possible to prevent an occurrence of an event where the allowing condition becomes unsatisfied due to the reason similar to the case where the allowing condition becomes unsatisfied by the MFP 100 due to the cause job by causing the MFP 100 not to receive a job from the external device.

In response to reception of a cause job from the cause job specifying portion 257, the notifying portion 259 notifies the user of the external device that has transmitted the cause job. For example, the cause job includes the device identification information for identifying the external device that is the source of transmission. The notifying portion 259 controls the communication unit 205 and transmits the device identification information of the cause job to the MFP 100 that is an error subject. The MFP 100 displays the device identification information that has been transmitted from the server 200 on the operation panel 115. Further, guide information indicating that the external device specified by the device identification information is the cause of an error occurring in the MFP 100 or that the external device specified by the device identification information is to be disconnected from the MFP 100, may be displayed together with the device identification information. The user can disconnect the external device specified by the device identification information displayed on the operation panel from the MFP 100 or change the settings of the external device specified by the device identification information displayed on the operation panel 115. Thus, an occurrence of an error in the MFP 100 can be prevented. The notifying portion 259 may transmit the device identification information for identifying the external device that is the source of transmission or the device identification information and the guide information to the user via email. In the case where the notifying portion 259 notifies the user of the external device, the user can prevent an occurrence of an error in the MFP 100 by changing the settings of the external device, or the like. Thus, the non-reception setting portion 258 may be made not to make settings of the reception rejection per job and the reception rejection per device in the MFP 100.

FIG. 8 is a diagram showing one example of jobs received by the MFP 100. Referring to FIG. 8, in the MFP 100, the allowing condition becomes unsatisfied by the operation state at 8:19, and an error occurs. In this case, the reference job specifying portion 57 specifies a subject reception period with the end point set at 8:19. Here, the length of the subject reception period is defined to be 10 minutes. Therefore, the subject reception period is from 8:09 to 8:19. In the subject reception period, the MFP 100 receives packets P3 to P10. The packets P3, P4 constitute a job B, the packets P5, P6 constitute a job C, the packets P7, P8 constitute a job D, and the packets P9, P10 constitute a job E. The reference job specifying portion 57 specifies the jobs B to E as reference jobs, and the reference job transmitting portion 59 transmits the reference jobs B to E to the server 200. The reference job acquiring portion 254 of the server 200 acquires the reference jobs B to E.

Figure 9:
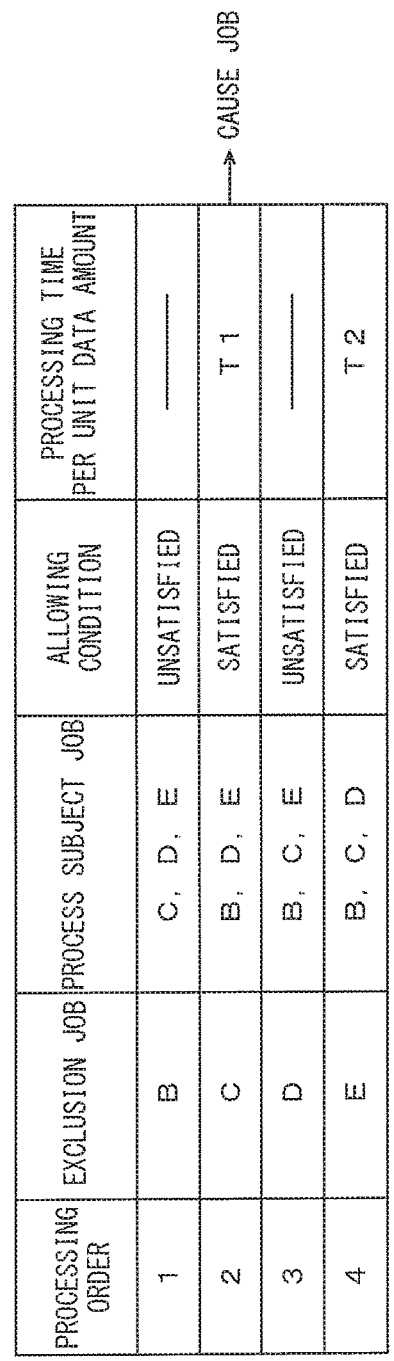
FIG. 9 is a diagram showing one example of selection of exclusion jobs and process subject jobs, and specification of a cause job in the first embodiment.

FIG. 9 is a diagram showing one example of selection of exclusion jobs and process subject jobs, and the specification of a cause job. Referring to FIG. 9, the selection portion 255 of the server 200 selects the exclusion jobs in the time order of reception by the MFP 100 (starting with the earliest) from the reference jobs B to E, and the cause job specifying portion 257 causes the virtual device to process the reference jobs that are not the exclusion job as process subject jobs. Specifically, the selection portion 255 first selects the reference job B as an exclusion job, and the cause job specifying portion 257 causes the virtual device to process the reference jobs C, D, E as process subject jobs. Next, the selection portion 255 selects the reference job C as an exclusion job, and the cause job specifying portion 257 causes the virtual device to process the reference jobs B, D, E as process subject jobs. Then, the selection portion 255 selects the reference job D as an exclusion job, and the cause job specifying portion 257 causes the virtual device to process the reference jobs B, C, E as process subject jobs. Next, the selection portion 255 selects the reference job E as an exclusion job, and the cause job specifying portion 257 causes the virtual device to process the reference jobs B, C, D as process subject jobs.

In FIG. 9, the virtual device processes the process subject jobs for each selection of an exclusion job. As a result, the allowing condition is unsatisfied by the operation state of the virtual device when the exclusion job B or D is selected. The allowing condition is satisfied by the operation state of the virtual device when the exclusion job C or E is selected. Further, a processing time T1 per unit data amount that is calculated when the exclusion job C is selected is shorter than a processing time T2 per unit data amount calculated when the exclusion job E is selected. In this case, the cause job specifying portion 257 specifies the exclusion job C as a cause job.

Figure 10:
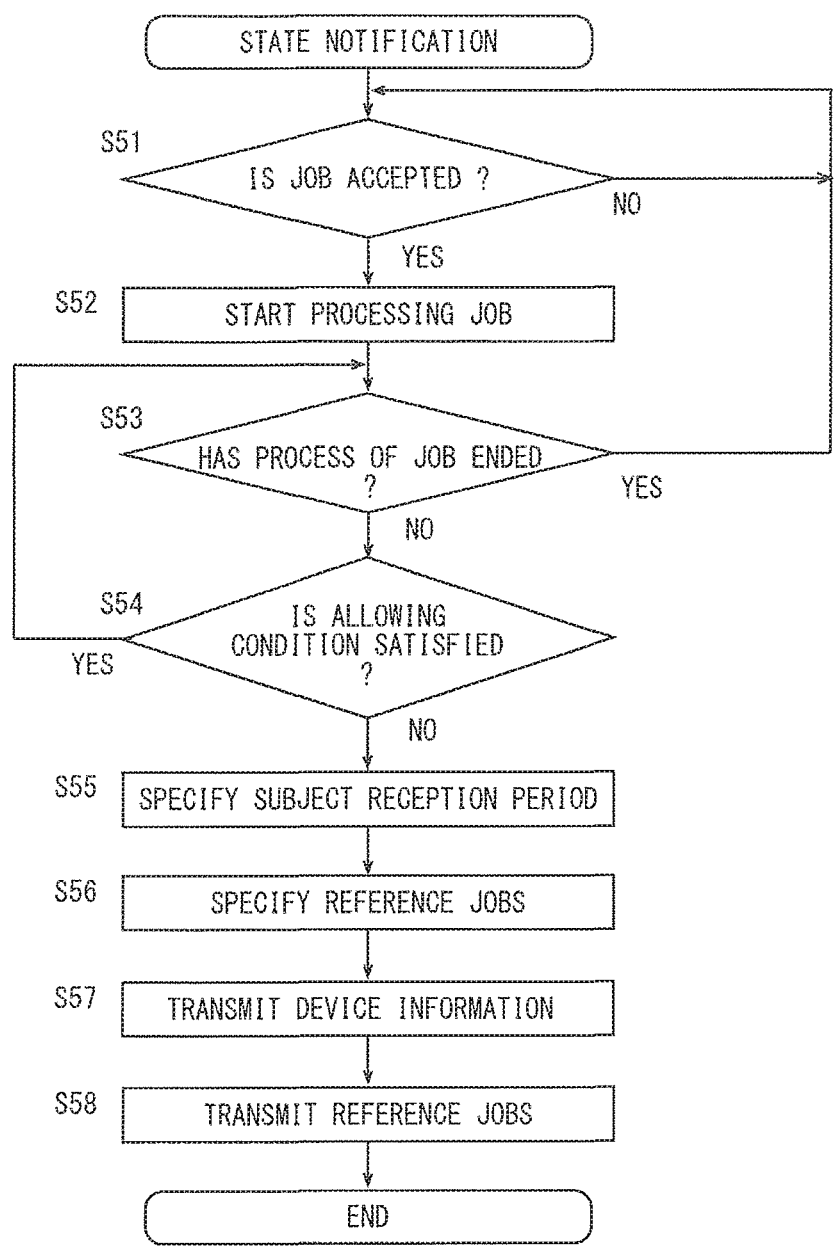
FIG. 10 is a flow chart showing one example of a flow of a state notification process in the first embodiment.

FIG. 10 is a flow chart showing one example of a flow of a state notification process in the first embodiment. The state notification process is a function implemented by the CPU 201 in the case where the CPU 171 included in the MFP 100 executes a state notification program stored in the ROM 173, the HDD 113 or the CD-ROM 181. The state notification program is part of the virtual execution program. Referring to FIG. 10, the CPU 171 determines whether a job has been accepted (step S51). The process waits until a job is accepted (NO in the step S51). If a job is accepted (YES in the step S51), the process proceeds to the step S52. If the communication I/F unit 160 has received a job from an external device (the PC 340, for example), the CPU 171 accepts the job. Further, in the case where the operation unit 119 accepts an operation of inputting a job by the user, the CPU 171 accepts the job. In the step S52, the CPU 171 starts processing the job that is accepted in the step S51, and the process proceeds to the step S53.

In the step S53, the CPU 171 determines whether the job the process of which is started in the step S52 has ended. If the job has ended, the process returns to the step S51. If not, the process proceeds to the step S54. In the step S54, the CPU 171 determines whether the allowing condition is satisfied by the operation state. Here, in the case where the utilization rate of the CPU 171 is equal to or lower than the upper limit value, it is determined that the allowing condition is satisfied by the operation state. When the allowing condition is satisfied by the operation state, the process returns to the step S53. If not, the process proceeds to the step S55.

In the step S55, the CPU 171 specifies the subject reception period based on a time point at which the allowing condition becomes unsatisfied by the operation state in the step S54, and the process proceeds to the step S56. Specifically, the time point at which the utilization rate of the CPU 171 exceeds the upper limit value is an end point of the subject reception period, and the time point that precedes the end point by a certain time period is a start point of the subject reception period. In the step S56, the CPU 171 specifies the jobs, which the communication I/F unit 160 has received from an external device in the subject reception period, as reference jobs, and the process proceeds to the step S57.

In the step S57, the CPU 171 produces the device information, controls the communication I/F unit 160 and transmits the device information to the server 200, and the process proceeds to the step S58. In the step S58, the CPU 171 controls the communication I/F unit 160 and transmits the reference jobs specified in the step S56, and the process ends.

Figure 11:
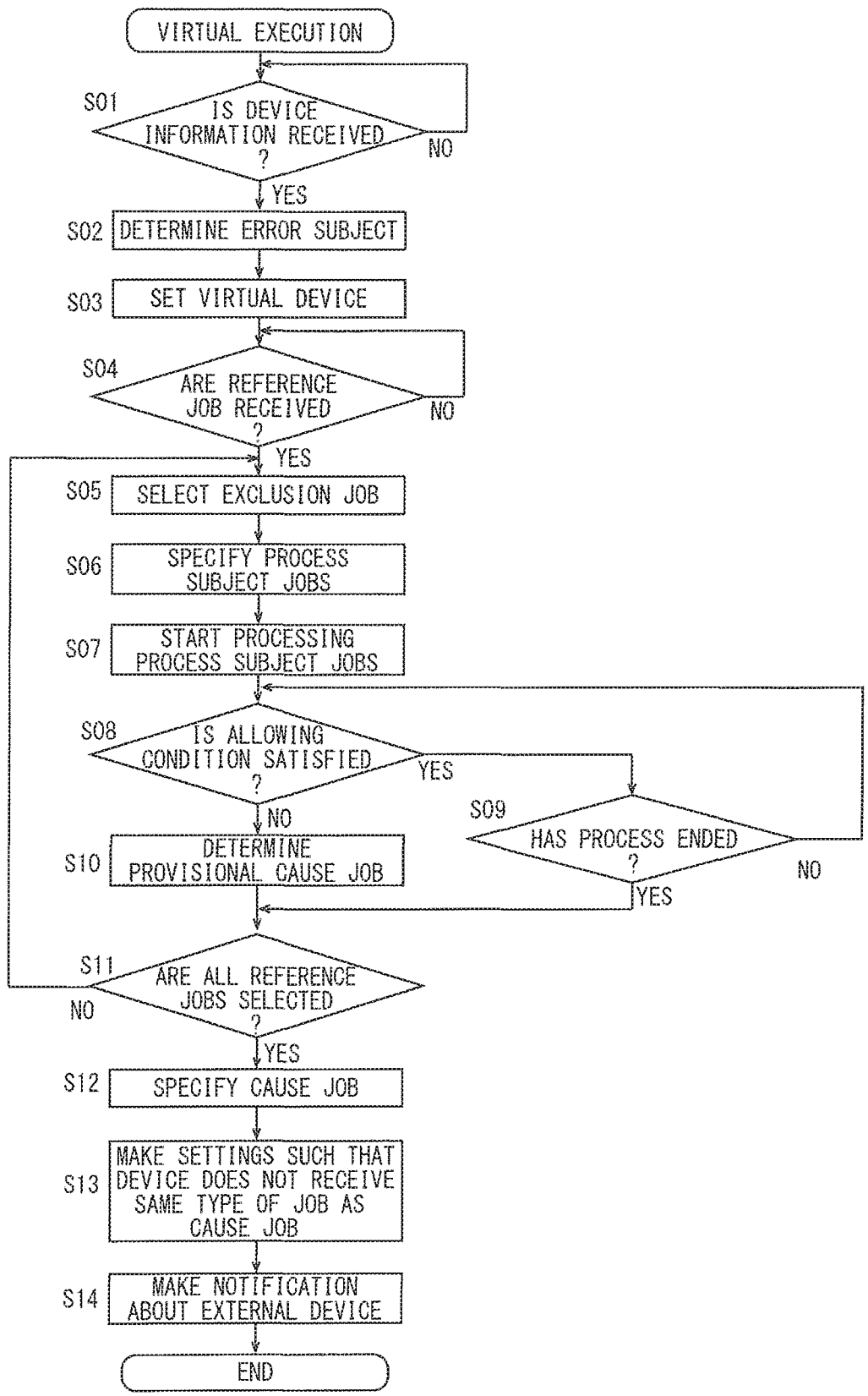
FIG. 11 is a flow chart showing one example of a flow of a virtual execution process in the first embodiment.

FIG. 11 is a flow chart showing one example of a flow of a virtual execution process in the first embodiment. The virtual execution process is a process executed by the CPU 201 in the case where the CPU 201 included in the server 200 in the first embodiment executes a state prediction program stored in the ROM 202, the HDD 204 or the CD-ROM 209. Referring to FIG. 11, the CPU 201 included in the server 200 determines whether device information has been received. When the communication unit 205 receives device information from one of the MFPs 100, 100A, 100B, the CPU 201 determines that the device information has been received. The process waits until the device information is received (NO in the step S01). When the device information is received (YES in the step S01), the process proceeds to the step S02. The CPU 201 acquires the device information received by the communication unit 205.

In the step S02, the CPU 201 determines that the device that has transmitted the device information is an error subject, and the process proceeds to the step S03. Here, the case where the device information is received from the MFP 100 will be described as an example. In this case, the CPU 201 determines that the MFP 100 is an error subject. In the step S03, the CPU 201 makes settings of a virtual device. The CPU 201 simulates the MFP 100 that is the error subject based on the device information received in the step S01. Specifically, an emulator that emulates the hardware resources defined by the hardware information included in the device information is set, the software resources defined by the software information included in the device information are set in a state of being ready to be run by the virtual CPU 301, and the setting value included in the device information is set.

In the step S04, the CPU 201 determines whether the reference jobs have been received from the device that is an error subject. In the case where the MFP 100 is the error subject, when the communication unit 205 receives the reference jobs from the MFP 100, the CPU 201 determines that the reference jobs have been received. The process waits until the reference jobs are received. If the reference jobs are received, the process proceeds to the step S05.

In the step S05, the CPU 201 selects one or more exclusion jobs from among the received reference jobs, and the process proceeds to the step S06. For example, in the case where the MFP 100 is the error subject, the CPU 201 selects an exclusion job in the time order of reception by the MFP 100 (starting with the earliest) from the reference jobs. In the step S06, the CPU 201 specifies the reference jobs that are not the exclusion job selected in the step S05 as the process subject jobs from among the reference jobs received in the step S04, and the process proceeds to the step S07. In the step S07, the CPU 201 starts processing the process subject jobs specified in the step S06 in the virtual device set in the step S03, and the process proceeds to the step S08.

In the step S08, the CPU 201 determines whether the allowing condition is satisfied by the operation state of the virtual device. Here, in the case where the utilization rate of the virtual CPU 301 is equal to or lower than the upper limit value, it is determined that the allowing condition is satisfied by the operation state of the virtual device. In the case where the allowing condition is satisfied by the operation state of the virtual device, the process proceeds to the step S09. If not, the process proceeds to the step S10. In the step S09, the CPU 201 determines whether the process of the process subject jobs that is started in the step S07 has ended. If the process of the process subject jobs has ended, the process proceeds to the step S11. If not, the process returns to the step S08.

In the step S10, the CPU 201 determines that the one or more exclusion jobs selected in the step S05 are provisional cause jobs, and the process proceeds to the step S11. In the step S11, the CPU 201 determines whether all of the reference jobs have been selected as exclusion jobs. If all of the reference jobs have been selected as exclusion jobs, the process proceeds to the step S12. If not, the process returns to the step S05, and the CPU 201 selects the unselected reference job as an exclusion job, and the process of the steps S05 to S11 is repeated.

In the step S12, the CPU 201 specifies one of the provisional cause jobs determined in the step S10 as a cause job, and the process proceeds to the step S13. In the case where only one selection of one or more exclusion jobs is determined as provisional cause jobs, the CPU 201 specifies the exclusion jobs included in the selection as the cause jobs. In the case where a plurality of selections of one or more exclusion jobs are determined to be provisional cause jobs, the CPU 201 specifies the exclusion job included in the selection corresponding to the process subject jobs that require the shortest processing time per unit data amount to be processed by the virtual device as the cause job.

In the step S13, the CPU 201 makes settings of the device that is an error subject such that the device does not receive the cause job specified in the step S12, and the process proceeds to the step S14. For example, in the case where the MFP 100 is an error subject, the CPU 201 controls the communication unit 205, and transmits the job identification information for identifying the cause job to the MFP 100. The MFP 100 sets the job specified by the job identification information as a reception rejection subject.

In the step S14, the CPU 201 notifies the user of the external device that has transmitted the cause job specified in the step S12, and the process ends. For example, in the case where the MFP 100 is an error subject, when the CPU 201 controls the communication unit 205, and transmits the device identification information of the cause job to the MFP 100, the MFP 100 displays the device identification information on the operation panel 115 together with the guide information.

As described above, the server 200 according to the first embodiment respectively acquires a plurality of jobs, which the MFP 100 has received externally before the allowing condition becomes unsatisfied by the operation state of a device that is an error subject, that is, the MFP 100, in this case, as reference jobs. Then, the server 200 causes the virtual device to process the reference jobs that are not one or more exclusion jobs as process subject jobs, and specifies the exclusion job as a cause job in the case where the allowing condition is satisfied by the operation state of the virtual device. Thus, the job that causes the allowing condition to become unsatisfied by the operation state of the MFP 100 can be easily specified.

Further, the server 200 makes settings of the MFP 100 such that the MFP 100 does not receive the same type of a job as the specified cause job. Thus, the allowing condition is prevented from becoming unsatisfied by the operation state of the MFP 100.

Further, in the case where a cause job is specified, the server 200 notifies the user of the external device that has transmitted the cause job. Thus, the user can easily recognize the external device that has transmitted the cause job. Further, in the case of being notified, the user can change the settings for the external device such that the MFP 100 does not receive the job similar to the cause job from the external device, or can disconnect the external device from the MFP 100.

Further, the server 200 determines whether the allowing condition is satisfied by the operation state of the virtual device for each selection of one or more exclusion jobs. In the case where the allowing condition is satisfied by the operation state of the virtual device when a plurality of selections of one or more exclusion jobs are made, the server 200 specifies one or more exclusion jobs included in the selection corresponding to the process subject jobs that require the shortest processing time per unit data amount as a cause job. Thus, the job that causes the allowing condition to become unsatisfied by the operation state of the MFP 100 can be appropriately specified from among a plurality of reference jobs.

Modified Example of First Embodiment

The server 200 in the modified example of the first embodiment includes a selection portion 255 that is different from the selection portion 255 of the first embodiment included in the CPU 201. The selection portion 255 in the modified example of the first embodiment selects all of a plurality of reference jobs that are transmitted from the same external device as exclusion jobs. For example, the selection portion 255 sequentially selects one external device from a plurality of external devices, selects all of a plurality of reference jobs that have been transmitted from the selected external device as exclusion jobs every time an external device is selected, and outputs the reference jobs that are transmitted from the other external devices to the cause job specifying portion 257 as process subject jobs. The cause job specifying portion 257 causes the virtual device to process the received process subject jobs, and specifies the exclusion jobs as the cause jobs in the case where the allowing condition is satisfied by the operation state of the virtual device. In other words, in the case where receiving a plurality of reference jobs from the external device that has transmitted a cause job, the cause job specifying portion 257 specifies all of a plurality of reference jobs received from the external device that has transmitted a cause job as cause jobs.

Figure 12:
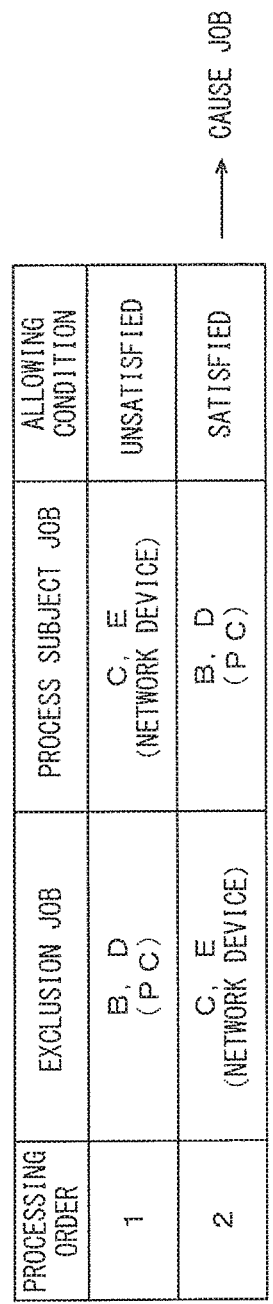
FIG. 12 is a diagram showing an example of selection of exclusion jobs and process subject jobs, and specification of a cause job in a modified example of the first embodiment.

FIG. 12 is a diagram showing another example of the selection of exclusion jobs and process subject jobs, and the specification of a cause job. In the example of FIG. 12, similarly to the example of FIG. 9, the jobs B, C, D, E shown in FIG. 8 are transmitted from the MFP 100 to the server 200 as reference jobs. The difference of the example of FIG. 12 from the example of FIG. 9 is that the selection portion 255 selects exclusion jobs per external device. Specifically, the selection portion 255 first selects the jobs B, D that have been transmitted from the PC 340 as exclusion jobs, and the cause job specifying portion 257 causes the virtual device to process the reference jobs C, E that have been transmitted from the network device 350 as process subject jobs. Next, the selection portion 255 selects the jobs C, E that have been transmitted from the network device 350 as exclusion jobs, and the cause job specifying portion 257 causes the virtual device to process the jobs B, D that have been transmitted from the PC 340 as process subject jobs.

In FIG. 12, in the case where the exclusion jobs B, D that have been transmitted from the PC 340 are selected, the allowing condition is unsatisfied by the operation state of the virtual device, and in the case where the exclusion jobs C, E that have been transmitted from the network device 350 are selected, the allowing condition is satisfied by the operation state of the virtual device. In this case, the cause job specifying portion 257 specifies the exclusion jobs C, E that have been transmitted from the network device 350 as cause jobs.

In this manner, the server 200 in the modified example of the first embodiment selects all of a plurality of reference jobs that have been transmitted from the same external device from among the plurality of acquired reference jobs as exclusion jobs. Thus, whether the allowing condition is satisfied by the operation state of the virtual device can be determined per external device that has transmitted the jobs. Therefore, the external device that causes the allowing condition to become unsatisfied by the operation state of the virtual device can be easily specified. Further, when the simulation is carried out per external device, the number of simulation is reduced, and a load on the CPU 201 can be reduced, as compared to the case where the simulation is carried out for each job. In particular, in the case where the reception rejection is set per external device in the MFP 100 that is an error subject such that the MFP 100 does not receive a job from the external device that has transmitted the cause job, it is possible to efficiently specify the external device that has transmitted the cause job by setting the exclusion jobs per external device and carrying out the simulation.

Aside from the jobs produced by an external device, a communication process between the MFP 100 and the external device may cause the allowing condition to become unsatisfied by the MFP 100. In this case, the simulate portion 251 may form a virtual external device by simulating the external device connected to the MFP 100 in addition to the MFP 100 that is an error subject, execute the communication process between the virtual device and the virtual external device, and specify what is causing the allowing condition to become unsatisfied by the MFP 100.

Further, in the case where the server 200 specifies a cause job by simulating a device that is an error subject, other devices in addition to the device that is an error subject may be set not to receive the same type of a job as the cause job and not to receive jobs from the external device that has transmitted a cause job. For example, in the case where the MFP 100 is an error subject, the server 200 may specify a cause job by simulating the MFP 100, and each of the MFPs 100, 100A, 100B may be set not to receive the same type of a job as the specified cause job or not to receive jobs from the external device that has transmitted the cause job. Thus, the allowing condition is prevented from becoming unsatisfied by the operation state of each of the MFPs 100, 100A, 100B. Further, the device that is an error subject and other devices are set similarly, so that a plurality of devices are easily managed.

Second Embodiment

Figure 13:
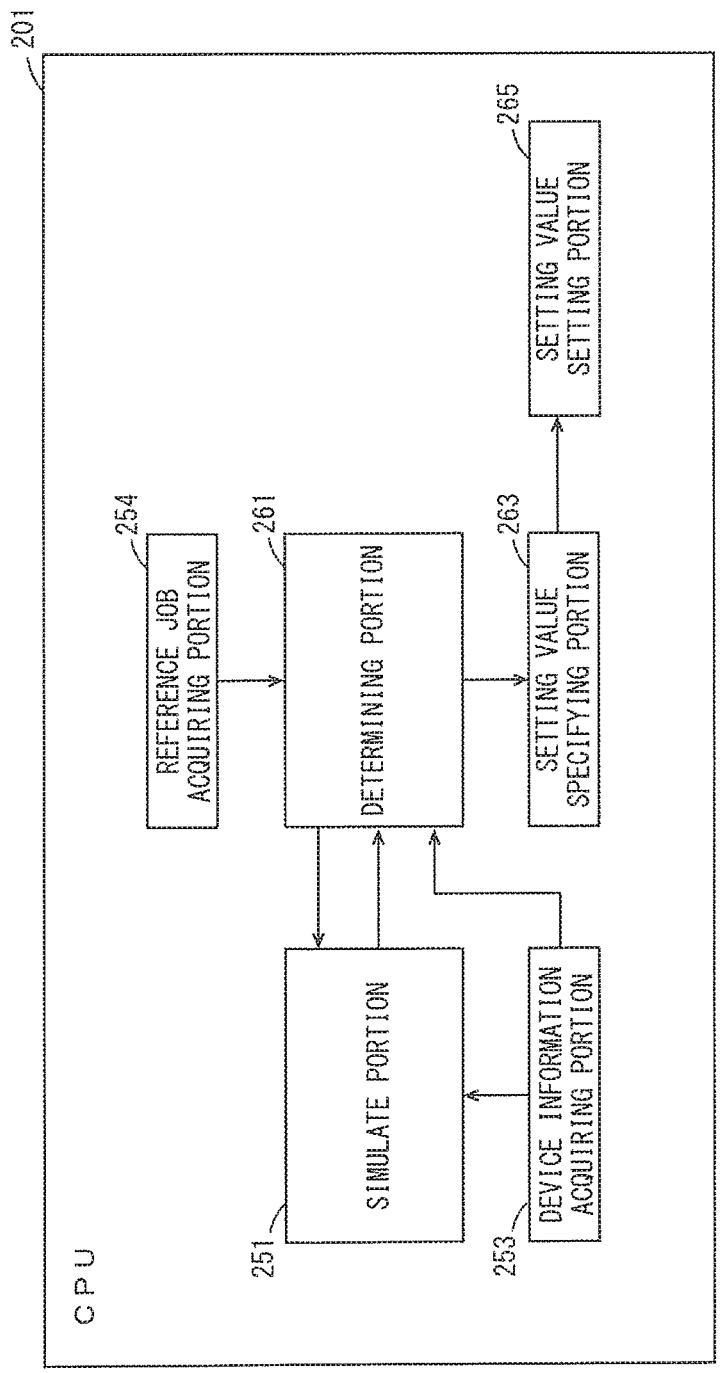
FIG. 13 is a block diagram showing one example of functions of a CPU included in a server in a second embodiment.

FIG. 13 is a block diagram showing one example of functions of a CPU included in a server in the second embodiment. Referring to FIG. 13, the functions of the CPU 201 included in the server 200 in the second embodiment are different from the functions shown in FIG. 7 in that the selection portion 255, the cause job specifying portion 257, the non-reception setting portion 258 and the notifying portion 259 are removed, and a determining portion 261, a setting value specifying portion 263 and a setting value setting portion 265 are added.

The determining portion 261 receives device information from a device information acquiring portion 253, and receives one or more reference jobs from a reference job acquiring portion 254. The determining portion 261 sets one or more virtual setting values, that are produced when a plurality of types of one or more setting values set in an MFP that is an error subject are changed, in the virtual device formed by the simulation portion 251. The determining portion 261 causes the virtual device in which the one or more virtual setting values are set to process the reference job, and determines whether the allowing condition is satisfied by the operation state of the virtual device. In the case where the allowing condition is satisfied by the operation state of the virtual device, the determining portion 261 outputs the one or more virtual setting values that are set in the virtual device to the setting value specifying portion 263 as provisional target setting values.

For example, in the case where the MFP is 100 an error subject, the device information received by the determining portion 261 includes a setting value set in the MFP 100. The setting value set in the MFP 100 is the size of a processing area (buffer size) of the CPU 171 that is secured in the RAM 175, for example. The determining portion 261 changes one or more setting values among a plurality of types of setting values included in the device information, and determines one or more virtual setting values, and sets one or more determined virtual setting values in the virtual device. The virtual setting value is the size of the processing area of the virtual CPU 301 to be secured in the virtual memory 303 (hereinafter referred to as a "virtual buffer size"), for example.

In the present example, the determining portion 261 sequentially sets a plurality of sets of one or more virtual setting values in the virtual device, and determines whether the allowing condition is satisfied by the operation state of the virtual device every time one or more virtual setting values are set. In the case where the allowing condition is satisfied by the operation state of the virtual device, the determining portion 261 outputs the one or more virtual setting values included in the set that is set to the setting value specifying portion 263 as a provisional target setting value.

The setting value specifying portion 263 specifies the one or more provisional target setting values received from the determining portion 261 as target setting values, and outputs the one or more target setting values to the setting value setting portion 265. In the case where receiving a plurality of sets of provisional target setting values from the determining portion 261, the setting value specifying portion 263 specifies the one or more provisional target setting values included in the set that requires the shortest processing time for the process of the reference job by the virtual device as target setting values. In response to reception of the one or more target setting values from the setting value specifying portion 263, the setting value setting portion 265 sets the one or more target setting values in the MFP that is an error subject. For example, the setting value setting portion 265 controls the communication unit 205 and transmits a set of a target setting value and item information, indicating which setting item the target setting value is to be set in, to the MFP 100 that is an error subject. The MFP 100 sets the target setting value that has been transmitted from the server 200 in the setting item indicated by the item information that has been transmitted from the server 200.

Figure 14:
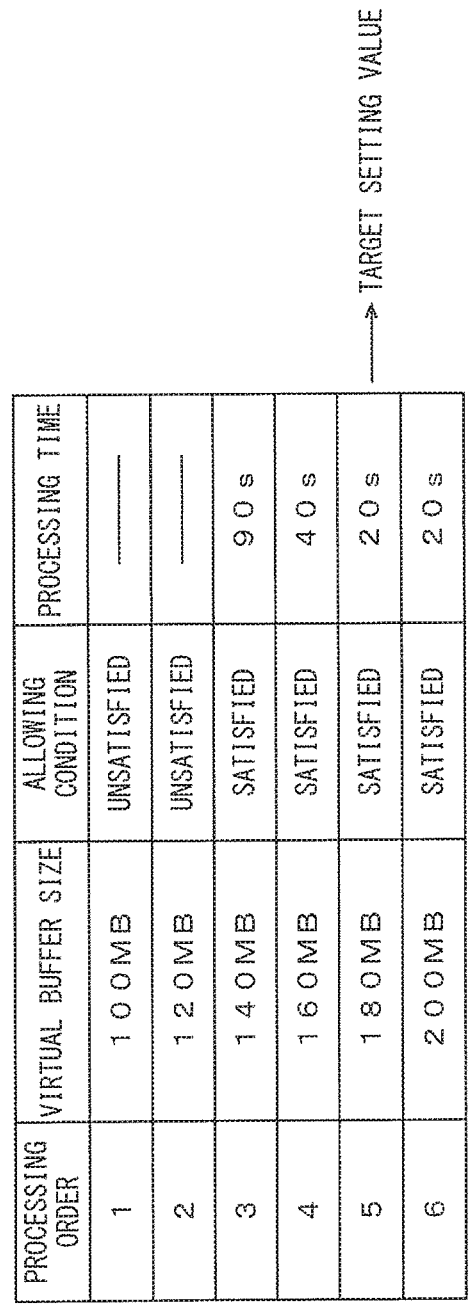
FIG. 14 is a diagram showing a setting example of virtual setting values in the second embodiment.

FIG. 14 is a diagram showing a setting example of a virtual setting value. The case where a virtual buffer size is set as a virtual setting value is described here as an example. Referring to FIG. 14, the determining portion 261 sequentially sets the virtual buffer sizes within a range from 100

MB to 200 MB in the virtual device. The determining portion 261 causes the virtual device to process a reference job every time the virtual buffer size is set, and determines whether the allowing condition is satisfied by the operation state of the virtual device. For example, in the case where the jobs B, C, D, E shown in FIG. 8 are transmitted from the MFP 100 to the server 200 as reference jobs, the determining portion 261 causes the virtual device to process each of the jobs B, C, D, E every time the virtual buffer size is set.

FIG. 14 shows the case where the allowing condition becomes unsatisfied by the operation state of the virtual device when the virtual buffer size is set to 100 MB or 120 MB, and the case where the allowing condition is satisfied by the operation state of the virtual device when the virtual buffer size is set to a value within a range from 140 MB to 200 MB. Further, FIG. 14 shows the case where the processing time of the reference job is 20 seconds and the shortest when the virtual buffer size is set to 180 MB or 200 MB. In this case, when the virtual buffer size is equal to or larger than 180 MB, the virtual device can process the reference job without delay. Even when the virtual buffer size is increased to be larger than 180 MB, the processing time does not change. Thus, the setting value specifying portion 263 specifies 180 MB as the target setting value to suppress the utilization rate of the hardware resources or the software resources.

Figure 15:
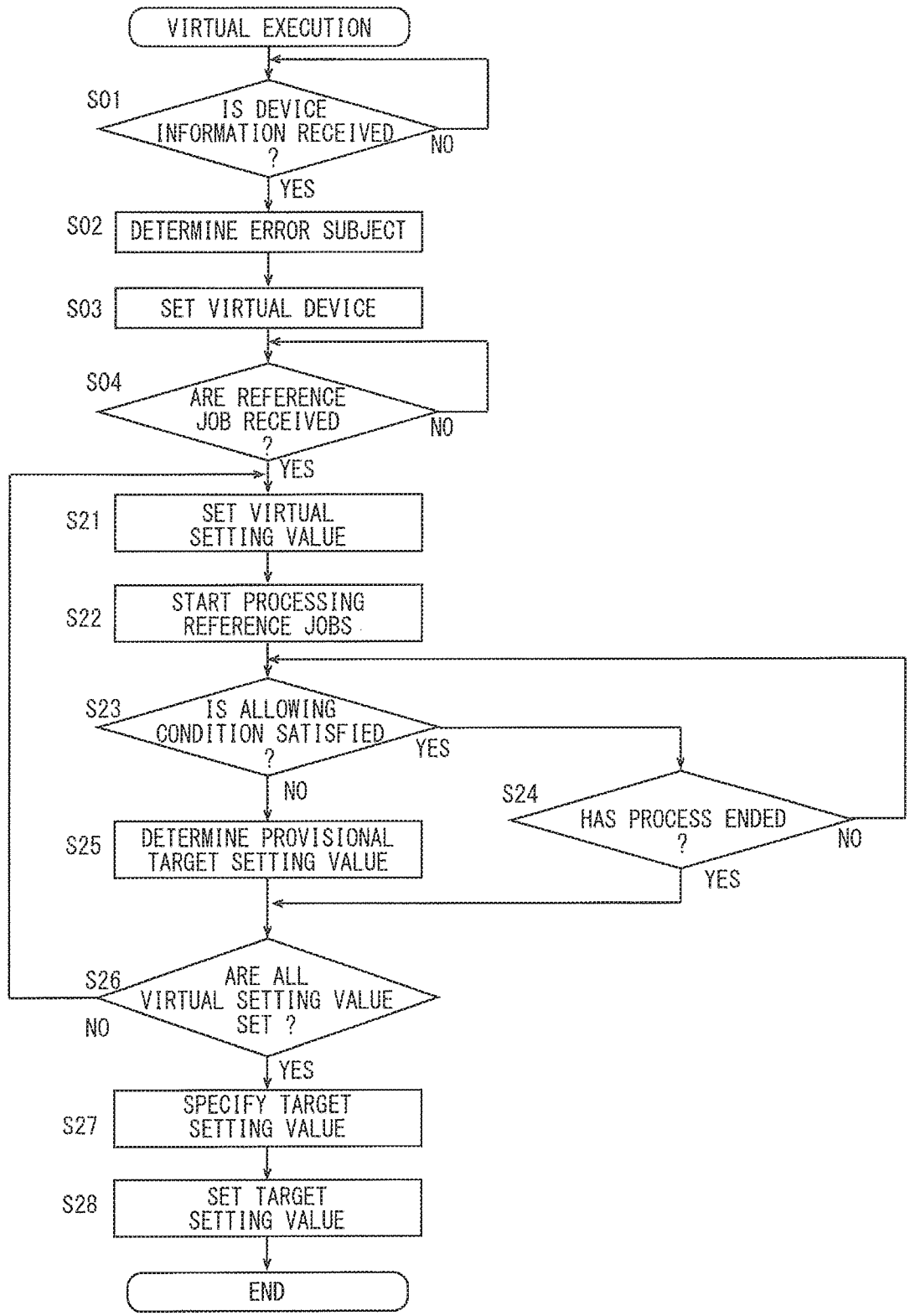
FIG. 15 is a flow chart showing one example of a flow of a virtual execution process in the second embodiment.

FIG. 15 is a flow chart showing one example of a flow of a virtual execution process in the second embodiment. Referring to FIG. 15, the virtual execution process in the second embodiment is different from the process shown in FIG. 11 in that the steps S5 to S13 are changed to the steps S21 to S28. The other process is the same as the process shown in FIG. 11. A description thereof therefore will not be repeated.

In the step S21, the CPU 201 sets the virtual setting values included in one set out of the plurality of prepared sets of virtual setting values in the virtual device, and the process proceeds to the step S22. In the step S22, the CPU 201 starts processing the reference job received in the step S04, and the process proceeds to the step S23. In the step S23, the CPU 201 determines whether the allowing condition is satisfied by the operation state of the virtual device. In the case where the allowing condition is satisfied by the operation state of the virtual device, the process proceeds to the step S24. If not, the process proceeds to the step S25. In the step S24, the CPU 201 determines whether the process of the reference job that is started in the step S22 has ended. If the process of the reference job has ended, the process proceeds to the step S26. If not, the process returns to the step S23.

In the step S25, the CPU 201 determines that the virtual setting values that are set in the step S21 and included in the set are the provisional target setting values, and the process proceeds to the step S26. In the step S26, the CPU 201 determines whether the virtual setting values included in all of the prepared sets have been set. If the virtual setting values included in all of the sets have been set, the process proceeds to the step S27. If not, the process returns to the step S21, and the CPU 201 sets the virtual setting values included in the next set in the virtual device. In the step S27, the CPU 201 specifies a provisional target setting value included in the set determined in the step S25 as the target setting value, and the process proceeds to the step S28. In the case where the virtual setting values included in only one set are determined as the provisional target setting values, the CPU 201 specifies the virtual setting values included in the set as the target setting values. On the other hand, in the case where the virtual setting values included in the plurality of sets are determined as the provisional target setting values, the CPU 201 specifies the virtual setting values included in the set that requires the shortest processing time for the process of the reference job by the virtual device as the target setting values. Further, in the case where there are a plurality of sets that require the shortest processing time, when the processing time is the same at the virtual setting values included in the plurality of sets, the CPU 201 specifies the virtual setting values included in the set with the lowest utilization rate of the hardware resources and the software resources out of the plurality of sets as the target setting values.

In the step S28, the CPU 201 sets the target setting values specified in the step S27 in a device in which an error has occurred, and the process ends. For example, in the case where the MFP 100 is an error subject, the CPU 201 controls the communication unit 205 and transmits a set of the target setting values and the item information to the MFP 100. The MFP 100 sets the target setting values in the setting item indicated by the item information.

As described above, the server 200 according to the second embodiment respectively acquires a plurality of jobs, which the MFP 100 has externally received before the allowing condition becomes unsatisfied by the operation state of the MFP 100 that is an error subject as reference jobs, causes the virtual device to process the acquired reference jobs with one or more virtual setting values set in the virtual device, and sets the one or more virtual setting values with which the allowing condition is satisfied by the operation state of the virtual device as the target setting values in the image forming apparatus. Thus, the setting values suitable for the environment in which the image forming apparatus is utilized can be set.

For example, as an environment in which the MFP 100 is utilized, there is an environment of the network 3 to which the MFP 100 is connected. The external devices connected to the network 3 change, and the data transmitted by the connected external devices to the MFP 100 is defined by the external devices. Therefore, the external device that has transmitted a cause job may retransmit the job that causes the allowing condition to become unsatisfied by the MFP 100. The target setting values are determined and set in the MFP 100. Thus, in the case where a job received from the external device is executed next time, the allowing condition can be satisfied.

Further, the server 200 determines whether the allowing condition is satisfied by the operation state of the virtual device every time one or more virtual setting values are set. In the case where there are a plurality of sets of one or more virtual setting values with which the allowing condition is satisfied by the operation states of the virtual device, the server 200 specifies a set of the one or more virtual setting values that requires the shortest processing time for the reference job executed by the virtual device as the target setting values. Thus, the MFP 100 that is an error subject can be operated better.

Further, the server 200 sets the virtual buffer size in the virtual device, carries out simulation and sets the virtual buffer size with which the allowing condition is satisfied by the operation state of the virtual device as the buffer size of the MFP 100. Thus, the buffer size of the MFP 100 can be adjusted to a value suitable for the environment in which the MFP 100 is utilized.

Further, in the case where specifying the target setting value by simulating the device that is an error subject, the server 200 may set the specified target setting value in other devices in addition to the device that is an error subject. For example, in the case where the MFP 100 is an error subject, the server 200 may specify the target setting value by simulating the MFP 100, and may set the specified target setting value in each of the MFPs 100, 100A, 100B. Thus, the allowing condition is prevented from becoming unsatisfied by the operation state of each of the MFPs 100, 100A, 100B. Further, the device that is an error subject and other devices are set similarly, whereby a plurality of devices can be easily managed.

Third Embodiment

Figure 16:
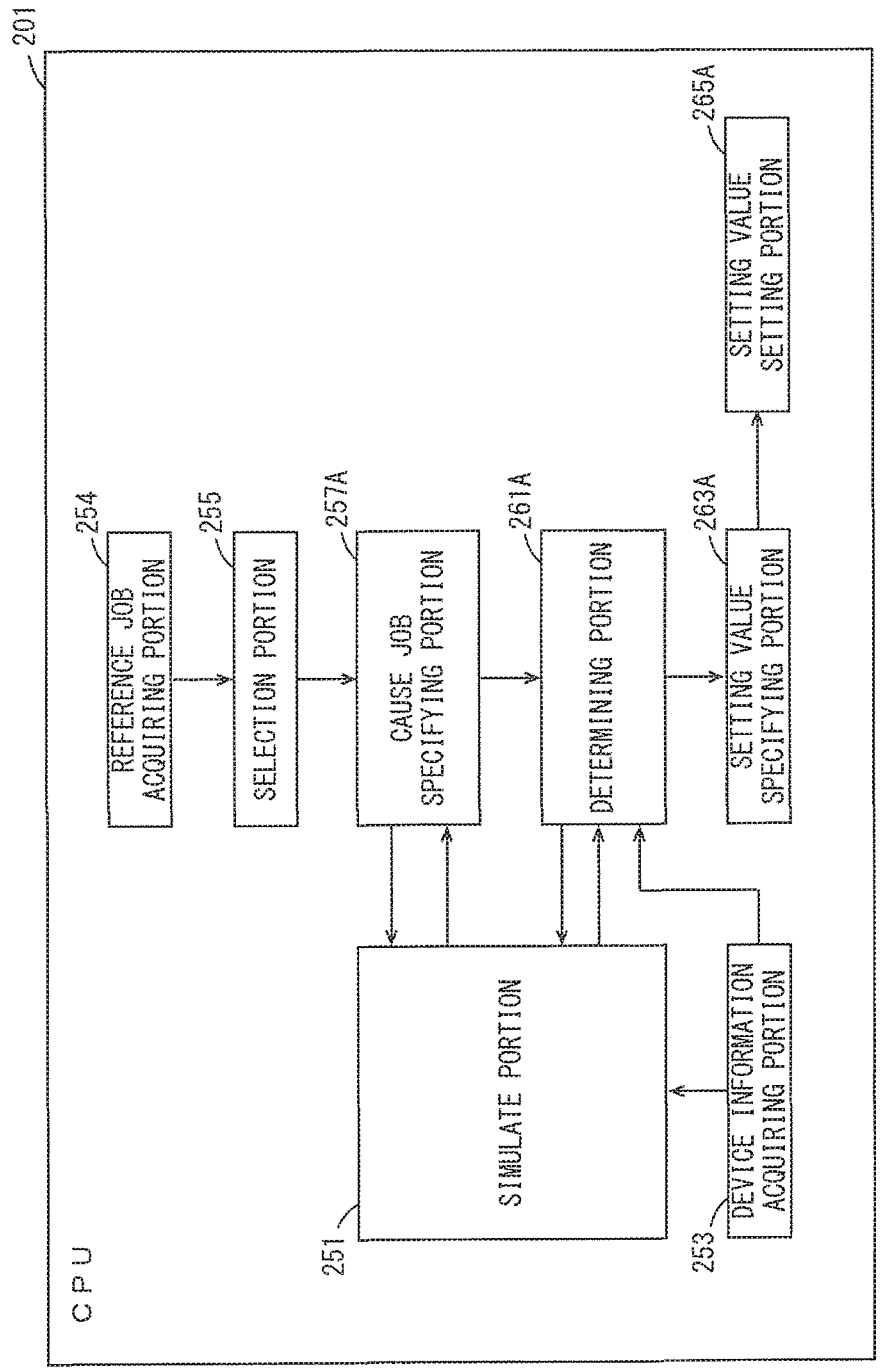
FIG. 16 is a block diagram showing one example of functions of a CPU included in a server in a third embodiment.

FIG. 16 is a block diagram showing one example of functions of a CPU included in a server in the third embodiment. Referring to FIG. 16, the functions of the CPU 201 included in the server 200 in the third embodiment are different from the functions shown in FIG. 7 in that the cause job specifying portion 257 is changed to a cause job specifying portion 257A, the non-reception setting portion 258 and the notifying portion 259 are removed, and a determining portion 261A, a setting value specifying portion 263A and a setting value setting portion 265A are added.

The cause job specifying portion 257A causes a virtual device that is formed by a simulate portion 251 to process the process subject jobs received from a selection portion 255 similarly to the cause job specifying portion 257 in the first embodiment, thereby specifying one or more cause jobs. The cause job specifying portion 257A outputs the specified cause jobs to the determining portion 261.

The determining portion 261A receives device information from the device information acquiring portion 253, and receives one or more cause jobs from the cause job specifying portion 257A. The determining portion 261A sets one or more virtual setting values, that are produced when one or more setting values of a plurality of types set in the MFP that is an error subject are changed, in the virtual device. The setting value set in the MFP 100 is the buffer size, for example, and the virtual setting value is a virtual buffer size in that case. The determining portion 261A causes the virtual device in which the one or more virtual setting values are set to process a cause job, determines whether the allowing condition is satisfied by the operation state of the virtual device, and specifies the one or more virtual setting values that are set in the case where the allowing condition is satisfied by the operation state of the virtual device as the provisional target setting values. In the present example, the determining portion 261A sequentially sets one or more virtual setting values included in a plurality of sets in the virtual device, and determines whether the allowing condition is satisfied by the operation state of the virtual device every time one or more virtual setting values are set. In the case where the allowing condition is satisfied by the operation state of the virtual device, one or more virtual setting values included in the set are output to the setting value specifying portion 263A as the provisional target setting values.

The setting value specifying portion 263A specifies one or more provisional target setting values received from the determining portion 261A as the target setting values, and outputs the one or more target setting values to the setting value setting portion 265. In the case where receiving a plurality of sets of provisional target setting values from the determining portion 261A, the setting value specifying portion 263A specifies the one or more provisional target setting values included in the selection that requires the shortest processing time for the process of the cause job by the virtual device as the target setting values. In response to reception of the one or more target setting values from the setting value specifying portion 263, the setting value setting portion 265A sets the one or more target setting values in the MFP that is an error subject.

The server 200 according to the third embodiment respectively acquires a plurality of jobs, which the MFP 100 has received externally before the allowing condition becomes unsatisfied by the operation state of the MFP 100 that is an error subject, as reference jobs, causes the virtual device to process the reference jobs that are not one or more exclusion jobs among the required reference jobs as process subject jobs, and specifies the exclusion job in the case where the allowing condition is satisfied by the operation state of the virtual device as a cause job. Further, the server 200 causes the virtual device to process the specified cause job with one or more virtual setting values set in the virtual device, and sets the one or more virtual setting values in the case where the allowing condition is satisfied by the operation state of the virtual device as the target setting values. Thus, the job that causes the allowing condition to become unsatisfied by the operation state of the MFP 100 can be easily specified. Further, the setting value suitable for the environment in which the MFP 100 is utilized can be set such that the MFP 100 can appropriately process the cause job.

While the server 200 is shown as one example of the virtual execution device in the above-mentioned embodiments, the present invention may of course be identified as a virtual execution method of causing the server 200 to execute the virtual execution process shown in FIG. 11 or 15, or a virtual execution program for causing the CPU 201 of the server 200 to perform the virtual execution method.

While the MFPs 100, 100A, 100B are described as one example of the image forming apparatus in the above-mentioned embodiment, the image forming apparatus may be a printer or a facsimile machine in addition to the MFPs 100, 100A, 100B.

Although embodiments of the present invention have been described and illustrated in detail, the disclosed embodiments are made for purpose of illustration and example only and not limitation. The scope of the present invention should be interpreted by terms of the appended claims.

What is claimed is:

1. A virtual execution device comprising a hardware processor,
   the hardware processor
   forming a virtual device by simulating an image forming apparatus in operation,
   in the case where a predetermined allowing condition is unsatisfied by an operation state of the image forming apparatus, acquiring a plurality of respective jobs that have been externally received by the image forming apparatus before the allowing condition becomes unsatisfied by the operation state of the image forming apparatus as reference jobs,
   selecting one or more reference jobs as exclusion jobs from among the plurality of acquired reference jobs,
   causing the virtual device to process subject jobs that are not the one or more selected exclusion jobs among the plurality of acquired reference jobs, and in the case where the allowing condition is satisfied by an operation state of the virtual device, specifying the exclusion jobs as cause jobs that have caused errors in the image forming apparatus.

2. The virtual execution device according to claim 1, wherein
the hardware processor, in the case where the cause jobs are specified, makes settings of the image forming apparatus such that types of jobs that are same as types of the specified cause jobs are not received.

3. The virtual execution device according to claim 1, wherein
the hardware processor, in the case where the cause jobs are specified, makes settings of the image forming apparatus such that jobs transmitted from external devices that have transmitted the cause jobs are not received.

4. The virtual execution device according to claim 1, wherein
the hardware processor selects all of a plurality of reference jobs as exclusion jobs which are transmitted from one external device from among the plurality of acquired reference jobs.

5. The virtual execution device according to claim 1, wherein
the hardware processor, in the case where the cause jobs are specified, notifies a user of an external device that has transmitted the cause jobs.

6. The virtual execution device according to claim 1, wherein
the hardware processor determines whether the allowing condition is satisfied by operation states of the virtual device every time the one or more exclusion jobs are selected, and
in the case where the allowing condition is satisfied by the operation states of the virtual device in a process of process subject jobs that respectively correspond to each of a plurality of selections of the one or more exclusion jobs, specifies the one or more exclusion jobs included in the selection of the one or more exclusion jobs as cause jobs, that correspond to the process subject jobs requiring the shortest processing time per unit data amount to be processed by the virtual device, among the plurality of selections of exclusion jobs.

7. The virtual execution device according to claim 1, wherein
the hardware processor, in the case where there are the plurality of image forming apparatus, specifies a common cause job for each of the plurality of image forming apparatuses.

8. The virtual execution device according to claim 1, wherein
the allowing condition is that a utilization rate of a central processing unit included in the image forming apparatus is equal to or lower than a value defined for the image forming apparatus, or that a processing time from a start till an end of a predetermined process executed by the central processing unit included in the image forming apparatus is equal to or lower than a value defined for the image forming apparatus.

9. A virtual execution device comprising a hardware processor,
the hardware processor
forming a virtual device by simulating an image forming apparatus in operation,
in the case where a predetermined allowing condition is unsatisfied by an operation state of the image forming apparatus, acquiring jobs that have been externally received by the image forming apparatus before the allowing condition becomes unsatisfied by the operation state of the image forming apparatus as reference jobs,
setting one or more virtual setting values that are produced when one or more setting values of a plurality of types of setting values set in the image forming apparatus are changed, in the virtual device, and causing the virtual device to process the reference jobs and determining whether the allowing condition is satisfied by operation states of the virtual device,
specifying one or more virtual setting values with which the allowing condition is satisfied by operation states of the virtual device as target setting values, and
setting the one or more specified target setting values in the image forming apparatus.

10. The virtual execution device according to claim 9, wherein
the hardware processor
determines whether the allowing condition is satisfied by an operation state of the virtual device every time each of the one or more virtual setting values is set, and
in the case where there are a plurality of sets of the one or more virtual setting values with which the allowing condition is satisfied by operation states of the virtual device, specifies a set of the one or more virtual setting values that requires a shortest processing time for the reference job executed by the virtual device as the target setting values.

11. The virtual execution device according to claim 9, wherein
a plurality of types of setting values set in the image forming apparatus include a size of a work area ensured in the image forming apparatus for processing a job.

12. The virtual execution device according to claim 9, wherein
the hardware processor, in the case where there are the plurality of image forming apparatuses, respectively sets the one or more specified target setting values in the plurality of image forming apparatuses.

13. The virtual execution device according to claim 9, wherein
the allowing condition is that a utilization rate of a central processing unit included in the image forming apparatus is equal to or lower than a value defined for the image forming apparatus, or that a processing time from a start till an end of a predetermined process executed by the central processing unit included in the image forming apparatus is equal to or lower than a value defined for the image forming apparatus.

14. A virtual execution method including:
virtually forming an image forming apparatus as a virtual device by simulating the image forming apparatus in operation,
in the case where a predetermined allowing condition is unsatisfied by an operation state of the image forming apparatus, acquiring a plurality of respective jobs that have been externally received by the image forming apparatus before the allowing condition becomes unsatisfied by the operation state of the image forming apparatus as reference jobs, and
selecting one or more reference jobs as exclusion jobs from the plurality of acquired reference jobs,
causing the virtual device to process reference jobs that are not the one or more selected exclusion jobs as process subject jobs, and
in the case where the allowing condition is satisfied by operation states of the virtual device, specifying the exclusion jobs as cause jobs that have caused errors in the image forming apparatus.

15. The virtual execution method according to claim 14, further including, in the case where there are the plurality of image forming apparatuses, causing the virtual execution device to specify a common cause job for each of the plurality of image forming apparatuses.

16. A virtual execution method including:
virtually forming an image forming apparatus as a virtual device by simulating the image forming apparatus in operation,
in the case where a predetermined allowing condition is unsatisfied by an operation state of the image forming apparatus, acquiring jobs that have been externally received by the image forming apparatus before the allowing condition becomes unsatisfied by the operation state of the image forming apparatus as reference jobs,
setting one or more virtual setting values that are produced when one or more setting values of a plurality of types of setting values set in the image forming apparatus are changed, in the virtual device, and processing the reference jobs and determining whether the allowing condition is satisfied by operation states of the virtual device,
specifying one or more virtual setting values with which the allowing condition is satisfied by operation states of the virtual device as target setting values, and
setting the one or more specified target setting values in the image forming apparatus.

17. The virtual execution method according to claim 16, further including, in the case where there are the plurality of image forming apparatuses, respectively setting the one or more specified target setting values in the plurality of image forming apparatuses.

18. A non-transitory computer-readable recording medium encoded with a virtual execution program,
the virtual execution program causing a hardware processor to
virtually form an image forming apparatus as a virtual device by simulating the image forming apparatus in operation,
in the case where a predetermined allowing condition is unsatisfied by an operation state of the image forming apparatus, acquire a plurality of respective jobs that have been externally received by the image forming apparatus before the allowing condition becomes unsatisfied by the operation state of the image forming apparatus, and
select one or more reference jobs as exclusion jobs from the plurality of acquired reference jobs,
causes the virtual device to process subject jobs that are not the one or more selected exclusion jobs among the plurality of acquired reference jobs, and in the case where the allowing condition is satisfied by an operation state of the virtual device, the virtual execution program causes the hardware processor to specify the exclusion jobs as cause jobs that have caused errors in the image forming apparatus.

19. The non-transitory computer-readable recording medium according to claim 18, wherein
the virtual execution program, in the case where there are the plurality of image forming apparatuses, further causes the hardware processor to specify a common cause job for each of the plurality of image forming apparatuses.

20. A non-transitory computer-readable recording medium encoded with a virtual execution program,
the virtual execution program causing a hardware processor to
virtually form an image forming apparatus as a virtual device by simulating the image forming apparatus in operation,
in the case where a predetermined allowing condition is unsatisfied by an operation state of the image forming apparatus, acquire jobs that have been externally received by the image forming apparatus before the allowing condition becomes unsatisfied by the operation state of the image forming apparatus as reference jobs,
set one or more virtual setting values that are produced when one or more setting values of a plurality of types of setting values set in the image forming apparatus are changed, in the virtual device, and process the reference jobs and determine whether the allowing condition is satisfied by operation states of the virtual device,
specify one or more virtual setting values with which the allowing condition is satisfied by operation states of the virtual device as target setting values, and
set the one or more specified target setting values in the image forming apparatus.

21. The non-transitory computer-readable recording medium according to claim 20, wherein
the hardware execution program, in the case where there are the plurality of image forming apparatuses, further causes the hardware processor to respectively set the one or more specified target setting values in the plurality of image forming apparatuses.

\* \* \* \* \*